(12) United States Patent
Oguro et al.

(10) Patent No.: US 12,453,197 B2
(45) Date of Patent: Oct. 21, 2025

(54) PHOTOELECTRIC CONVERSION DEVICE AND PHOTOELECTRIC CONVERSION SYSTEM

(71) Applicant: CANON KABUSHIKI KAISHA, Tokyo (JP)

(72) Inventors: Yasuhiro Oguro, Tokyo (JP); Daisuke Kobayashi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 676 days.

(21) Appl. No.: 17/588,039

(22) Filed: Jan. 28, 2022

(65) Prior Publication Data

US 2022/0246652 A1    Aug. 4, 2022

(30) Foreign Application Priority Data

Feb. 4, 2021   (JP) ................. 2021-016453

(51) Int. Cl.
*H10F 39/00*    (2025.01)
*B60W 30/09*    (2012.01)
(Continued)

(52) U.S. Cl.
CPC ........... *H10F 39/802* (2025.01); *B60W 30/09* (2013.01); *H01L 23/36* (2013.01); *H04N 25/63* (2023.01);
(Continued)

(58) Field of Classification Search
CPC ........... H01L 27/14603; H01L 27/4636; H01L 23/36; H01L 23/3677; B60W 30/09;
(Continued)

(56) References Cited

U.S. PATENT DOCUMENTS 8,274,101 B2 * 9/2012 Venezia ............ H01L 27/14603
257/225
2019/0103425 A1 * 4/2019 Yoon ................. H01L 27/14634
(Continued)

FOREIGN PATENT DOCUMENTS

JP    2012164870 A    8/2012
JP    2020025263 A    2/2020
(Continued)

*Primary Examiner* — Michael M Trinh
(74) *Attorney, Agent, or Firm* — Canon U.S.A., Inc. IP Division

(57) ABSTRACT

A photoelectric conversion device includes a first substrate including a pixel array portion, in which a plurality of photoelectric conversion portions is arranged in a two-dimensional array shape in planar view, and a first wiring pattern, and a second substrate including a machine learning portion configured to perform processing of a signal obtained from electric charge generated by the photoelectric conversion portions and a second wiring pattern, the first substrate and the second substrate being stacked on each other, wherein the first wiring pattern of the first substrate and the second wiring pattern of the second substrate are joined to each other to configure a metal joining portion, wherein a heat dissipation portion including the metal joining portion connected to the machine learning portion is located at a position overlapping the machine learning portion, and wherein the pixel array portion and the machine learning portion do not overlap each other.

22 Claims, 18 Drawing Sheets

(51) Int. Cl.
*H01L 23/36* (2006.01)
*H04N 25/63* (2023.01)

(52) U.S. Cl.
CPC ..... *H10F 39/811* (2025.01); *B60W 2420/403* (2013.01); *B60W 2554/801* (2020.02); *B60W 2554/802* (2020.02)

(58) Field of Classification Search
CPC ..... B60W 2420/403; B60W 2554/801; B60W 2554/802; H04N 25/60; H04N 25/63; H10F 39/802; H10F 39/811; H10F 39/80
See application file for complete search history.

(56) References Cited

U.S. PATENT DOCUMENTS

| | | | |
|---|---|---|---|
| 2019/0252443 A1* | 8/2019 | Kobayashi | H01L 27/14607 |
| 2020/0273901 A1* | 8/2020 | Nakamura | H01L 28/60 |
| 2021/0043792 A1* | 2/2021 | Iwata | G01S 17/931 |
| 2022/0246663 A1* | 8/2022 | Kobayashi | H04N 23/951 |

FOREIGN PATENT DOCUMENTS

| | | | |
|---|---|---|---|
| JP | 2020072410 A | 5/2020 |
| JP | 2020123762 A | 8/2020 |
| JP | 2021005656 A | 1/2021 |
| WO | 2020027161 A1 | 2/2020 |
| WO | 2020027230 A1 | 2/2020 |
| WO | 2020262582 A1 | 12/2020 |

* cited by examiner

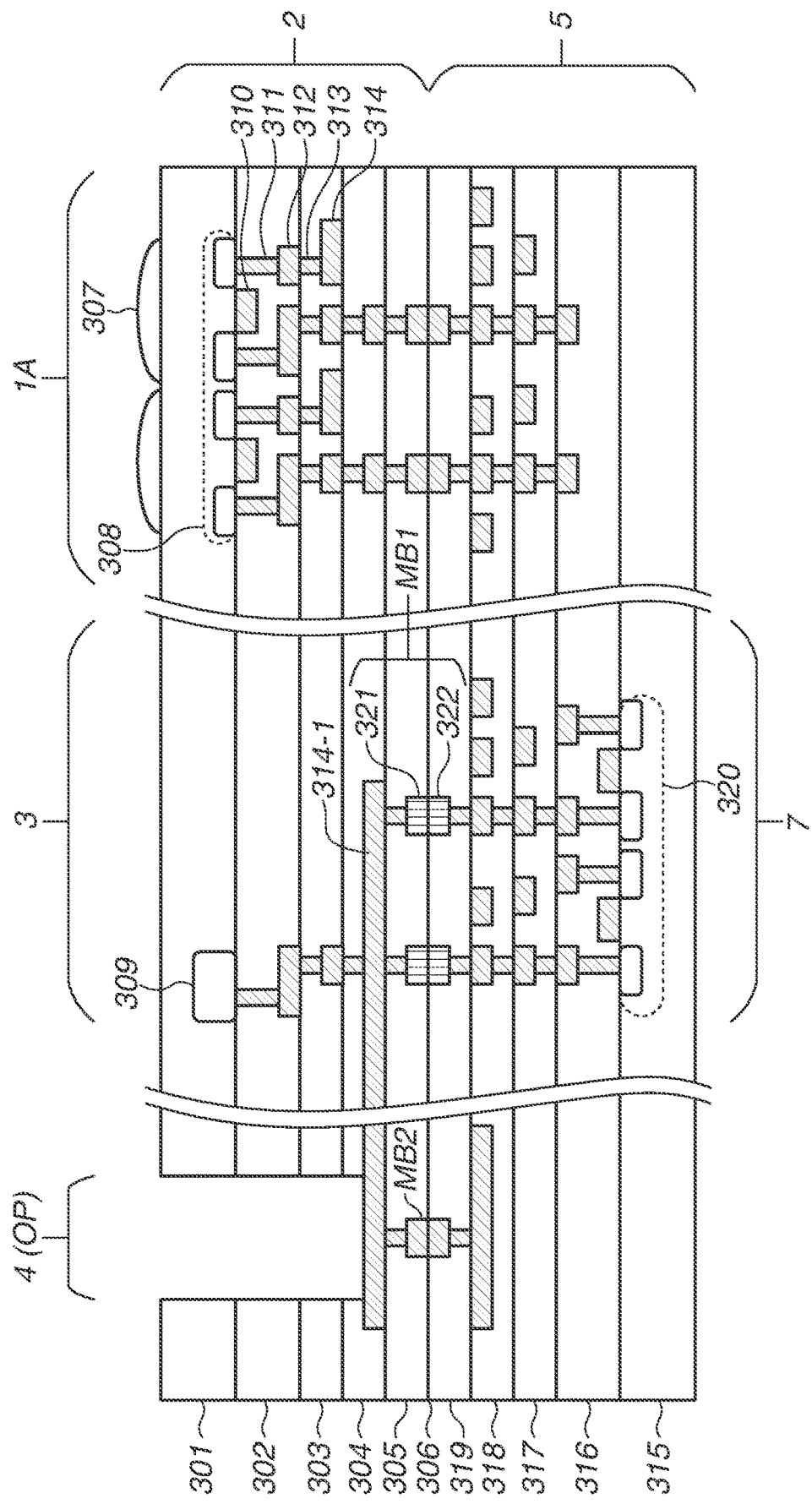

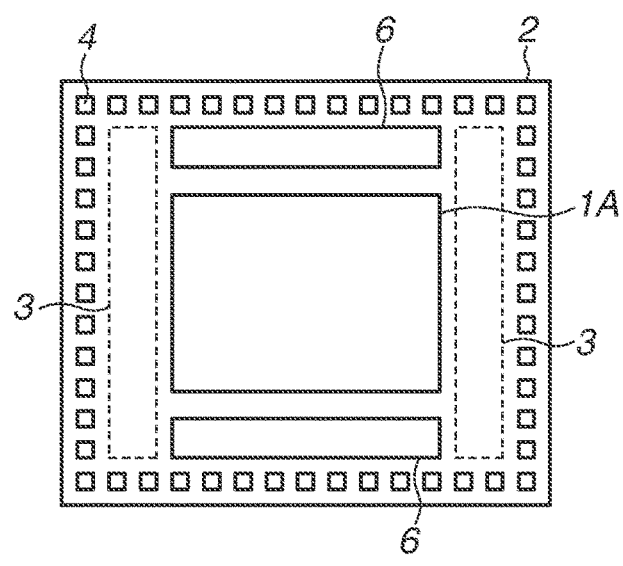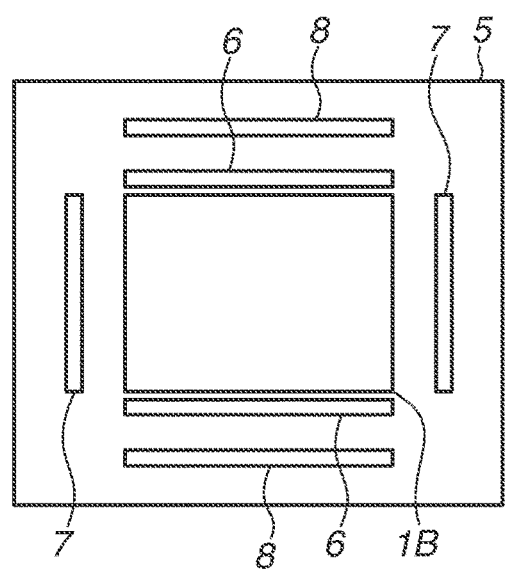

FIG.15B
FRONT VIEW
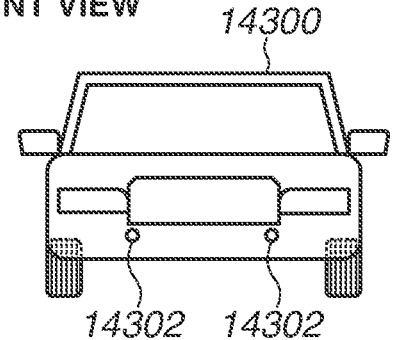
TOP VIEW
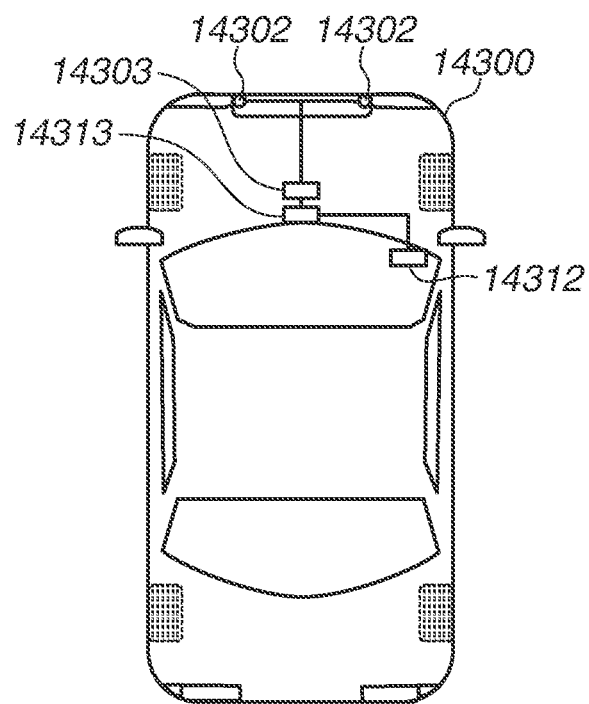
REAR VIEW
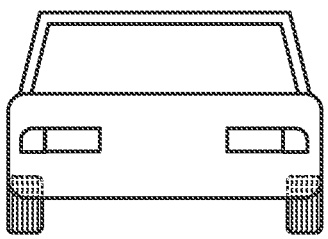

PHOTOELECTRIC CONVERSION DEVICE AND PHOTOELECTRIC CONVERSION SYSTEM

BACKGROUND

Field of the Disclosure

Aspects of the embodiments generally relate to a photoelectric conversion device and a photoelectric conversion system.

Description of the Related Art

Japanese Patent Application Laid-Open No. 2020-072410 discusses a photoelectric conversion device with a layered structure including a machine learning portion inside the photoelectric conversion device intended to enable advanced processing to be performed in the photoelectric conversion device. Japanese Patent Application Laid-Open No. 2020-072410 also discusses that arranging an electromagnetic shield between a pixel array portion and a machine learning portion which are located in respective different substrates enables preventing noise occurring in the machine learning portion from penetrating into the pixel array portion.

SUMMARY OF THE DISCLOSURE

According to an aspect of the embodiments, a photoelectric conversion device includes a first substrate including a pixel array portion, in which a plurality of photoelectric conversion portions is arranged in a two-dimensional array shape in planar view, and a first wiring pattern, and a second substrate including a machine learning portion configured to perform processing of a signal obtained from electric charge generated by the photoelectric conversion portions and a second wiring pattern, the first substrate and the second substrate being stacked on each other, wherein the first wiring pattern of the first substrate and the second wiring pattern of the second substrate are joined to each other to configure a metal joining portion, wherein a heat dissipation portion including the metal joining portion connected to the machine learning portion is located at a position overlapping the machine learning portion, and wherein the pixel array portion and the machine learning portion are located at respective positions not overlapping each other.

Further features of the disclosure will become apparent from the following description of exemplary embodiments with reference to the attached drawings.

BRIEF DESCRIPTION OF THE DRAWINGS

FIG. 3 is a sectional schematic view of the photoelectric conversion device in the first exemplary embodiment.

FIGS. 7A and 7B are plan views of a photoelectric conversion device in a fourth exemplary embodiment.

FIGS. 15A and 15B are diagrams illustrating a photoelectric conversion system and a moving body in a tenth exemplary embodiment.

DESCRIPTION OF THE EMBODIMENTS

Figure 1A:
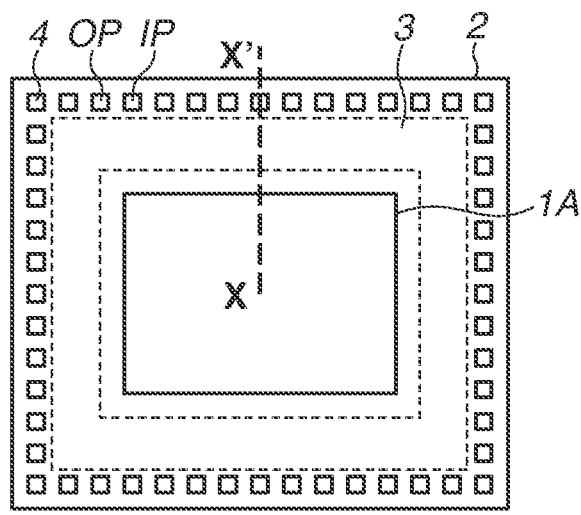
FIGS. 1A, 1B, and 1C are plan views and a perspective view of a photoelectric conversion device in a first exemplary embodiment.

A machine learning portion, which performs machine learning processing, processes a large volume of data at high speed and is, therefore, concerned about heat generation occurring at the time of performing a processing operation. In the photoelectric conversion device discussed in Japanese Patent Application Laid-Open No. 2020-072410, a pixel array portion, a machine learning portion, and an electromagnetic shield are arranged to be superposed on each other. Arranging such constituent components as discussed in Japanese Patent Application Laid-Open No. 2020-072410 may cause the possibility that heat generation occurring at the machine learning portion propagates to the pixel array portion and thus causes degradation in image quality.

The technique to be described below relates to a technique to reduce image quality degradation by causing heat generation occurring at a machine learning portion to be unlikely to propagate to a pixel array portion.

The following exemplary embodiments are intended to embody a technological thought of the disclosure and should not be construed to limit the disclosure. The sizes and relationships of members illustrated in the respective drawings may be exaggerated for illustrative purposes. In the following description, the same constituent elements are assigned the respective same reference characters and any repetitive description thereof may be omitted as appropriate.

In the present specification, the term "planar view" refers to being viewed from a direction perpendicular to a light entrance surface of a first substrate 2 described below. Moreover, the term "cross-section" refers to a surface in a direction perpendicular to the light entrance surface of the first substrate 2. Furthermore, in a case where the light entrance surface of the first substrate 2 is a coarse surface as seen in the microscopic sense, the planar view is defined based on the light entrance surface of the first substrate 2 as seen in the macroscopic sense.

In the present specification, the depth direction is a direction leading from the light entrance surface (first surface) of the first substrate 2 toward a surface (second surface) on the side where a circuit substrate 21 is located.

Figure 1B:
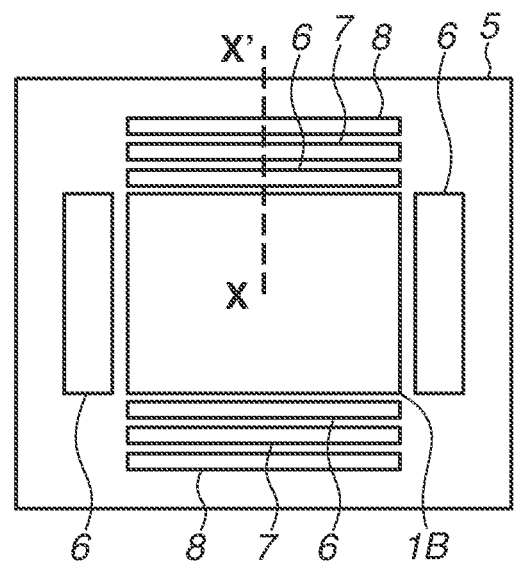
Figure 1C:
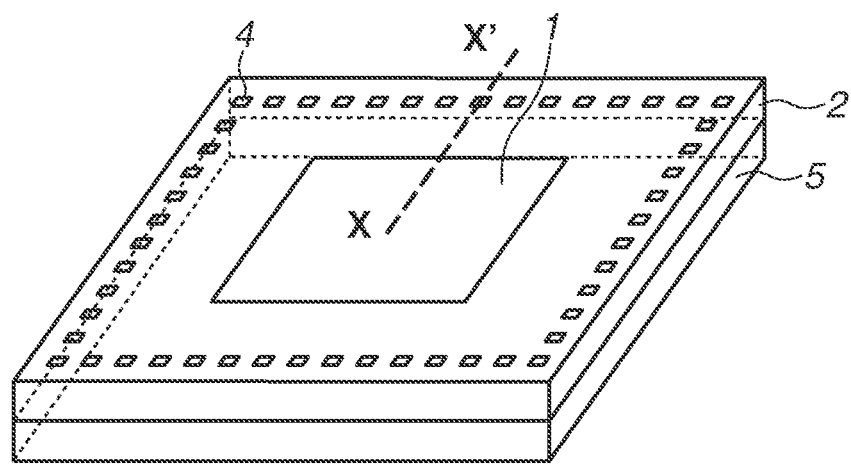

A first exemplary embodiment is described. FIGS. 1A, 1B, and 1C illustrate a photoelectric conversion device in the first exemplary embodiment. FIG. 1C is a perspective view of the photoelectric conversion device, and FIG. 1A is a plan view of the first substrate 2 with the photoelectric conversion device viewed from the side of the light entrance surface. Moreover, FIG. 1B is a plan view of a second substrate 5 with the photoelectric conversion device illustrated in FIG. 1C viewed from the light entrance surface side. The light entrance surface side of the second substrate 5 is a side as viewed from a surface of the second substrate 5 joined to the first substrate 2. The photoelectric conversion device in the first exemplary embodiment has a structure in which the first substrate 2 and the second substrate 5 are stacked on and joined to each other as illustrated in FIG. 1C. A wiring structure is located between the first substrate 2 and the second substrate 5, and the wiring structure includes a plurality of wiring layers. In FIGS. 1A to 1C, in a case where a suffix "A" is assumed to be allocated to each constituent part located in the first substrate 2 and a suffix "B" is assumed to be allocated to each constituent part located in the second substrate 5, the constituent parts A and B are arranged to overlap each other when the first substrate 2 and the second substrate 5 are bonded to each other. For example, a pixel array portion 1A and a pixel circuit portion 1B overlap each other in planar view and are electrically interconnected via wiring layers.

As illustrated in FIG. 1A, a pixel array portion 1A, in which a plurality of photoelectric conversion portions is arranged in a two-dimensional array shape in planar view, a heat dissipation portion 3, which is located around the pixel array portion 1A in planar view, and pads 4, which are located at an outer circumferential portion of the first substrate 2, are arranged in the first substrate 2.

Moreover, as illustrated in FIG. 1B, a pixel circuit portion 1B, a readout circuit portion 6, a machine learning portion 7, and an output interface portion 8 are arranged in the second substrate 5. The machine learning portion 7 is located at a position planarly overlapping the heat dissipation portion 3 arranged in the first substrate 2.

The machine learning portion 7 performs processing of signals obtained from electric charge generated by the photoelectric conversion portions. The machine learning portion 7 functions as a processing portion which performs various processing operations with use of a trained model created by machine learning using, for example, a deep neural network (DNN). Such a trained model (neural network calculation model) can be a model designed based on parameters generated by inputting, into a predetermined machine learning model, an input signal equivalent to an output of the pixel array portion 1A and learning data in which a label is associated with the input signal. Moreover, the predetermined machine learning model can be a learning model using a multi-layered neural network (also called a multi-layered neural network model).

The machine learning portion 7 performs arithmetic processing that is based on a trained model included in the machine learning portion 7, thus performing processing for multiplying a dictionary coefficient included in the trained model by image data obtained from the pixel array portion 1A. The machine learning portion 7 is able to output a result obtained from such arithmetic processing (arithmetic result) to the output interface portion 8. Furthermore, the arithmetic result can include image data obtained by performing arithmetic processing using a trained model and various pieces of information (metadata) obtained from the image data.

The machine learning portion 7 is able to train a learning model by changing weighting factors of various parameters included in the learning model with use of learning data. Moreover, the machine learning portion 7 is able to prepare a plurality of learning models in advance and change learning models to be used according to the content of arithmetic processing.

Additionally, the machine learning portion 7 is able to acquire a trained learning model from an external apparatus. In this way, the machine learning portion 7 is able to perform the above-mentioned arithmetic processing.

The pads 4 include input pads IP, which input, from an external circuit, a power source voltage and a signal output from, for example, a transistor of each pixel circuit, and output pads OP, which output a signal to the external circuit. The pads 4, to which the external circuit is electrically connected, can be any of a pad electrode located in a wiring layer, a pad electrode connected to a penetration electrode penetrating from one surface of a semiconductor substrate to the opposite other surface thereof, and a pad electrode located in a semiconductor layer of each substrate. While, as illustrated in FIGS. 1A and 1C, a plurality of pads 4 is located along four sides constituting an outer perimeter portion of the first substrate 2, the location of pads 4 is not limited to this configuration. For example, the pads 4 can be located along two opposite sides, or the pads 4 can be located along one side of the four sides.

While, in FIGS. 1A to 1C, the output pads OP and the input pads IP are arranged alternately one by one, the first exemplary embodiment is not limited to this. Although details are described below, since heat generated at the machine learning portion 7 is able to be exhausted via the output pads OP or the input pads IP, it is favorable that the pads 4 are located near the machine learning portion 7. Since the output pads OP and the input pads IP are arranged alternately one by one, even in a case where heat dissipation is performed from either the output pads OP or the input pads IP, it is possible to provide the heat dissipation portion 3 over the entire circumference of the pixel array portion 1A and, thus, it is possible to make the area of the heat dissipation portion 3 larger. Accordingly, it is possible to reduce heat dissipation unevenness.

The location interval between the output pads OP and the input pads IP does not need to be alternateness, but can be an interval of a predetermined number for each. Moreover, pads 4 near the machine learning portion 7 can be set as output pads OP and pads 4 far from the machine learning portion 7 can be set as input pads IP.

The number of output pads OP and the number of input pads IP can be the same or different from each other. The number of output pads OP and the number of input pads IP can be compared with each other based on, for example, a plurality of pads 4 located along a region in which the machine learning portion 7 is located. Even in a case where the number of input pads IP is larger than the number of output pads OP, it is possible to obtain a certain amount of exhaust heat effect.

Figure 2:
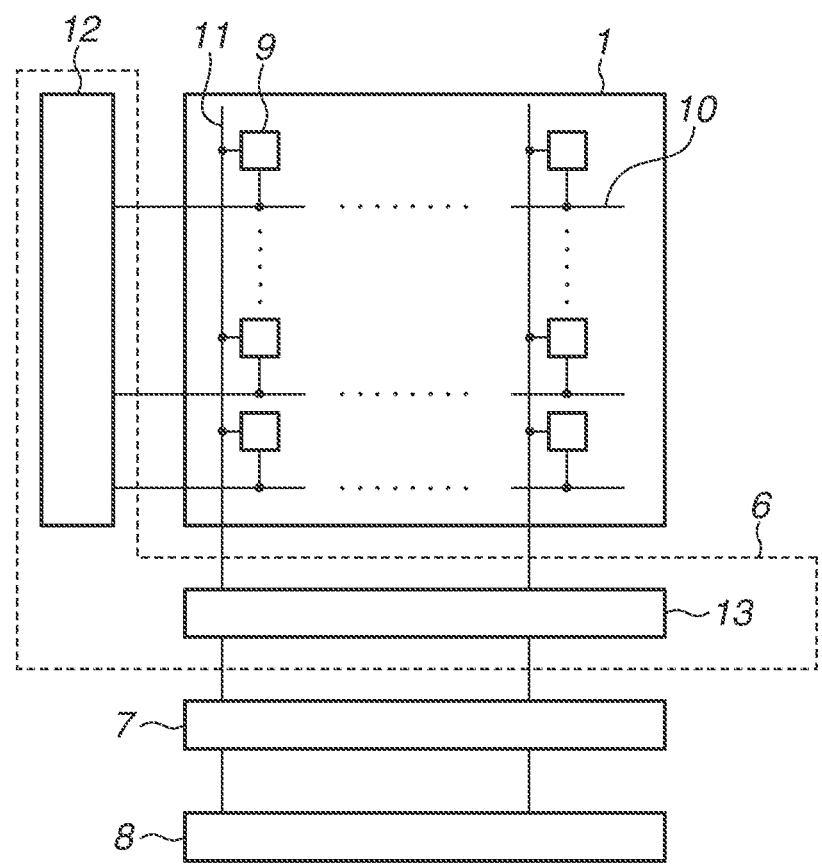
FIG. 2 is a block diagram illustrating an overall configuration of the photoelectric conversion device in the first exemplary embodiment.

FIG. 2 is a diagram illustrating an overall configuration of the photoelectric conversion device in the first exemplary embodiment. The photoelectric conversion device includes, as illustrated in FIG. 2, a pixel array portion 1, a readout circuit portion 6, a machine learning portion 7, and an output interface portion 8. The pixel array portion 1 includes a plurality of light receiving pixels 9 in horizontal and vertical directions. The readout circuit portion 6 includes a vertical scanning circuit 12 and a readout circuit 13. The vertical scanning circuit 12 supplies, to pixel drive signal lines 10, control pulses for controlling driving of transistors included in the respective pixels. In response to the control pulses supplied from the vertical scanning circuit 12, the light receiving pixels 9 included in the pixel array portion 1 operate. Each light receiving pixel 9 includes a photoelectric conversion portion such as a photodiode. The light receiving pixel 9 photoelectrically converts incident light coming from outside into an electrical signal, and outputs a pixel signal corresponding to the amount of incident light based on the obtained electrical signal. One pixel drive signal line 10 is connected in common to light receiving pixels 9 located in one row. Moreover, one vertical output line 11 is connected in common to light receiving pixels 9 located in one column. Pixel signals output from light receiving pixels 9 to the vertical output lines 11 located in the respective columns are input to the readout circuit 13 located for the respective columns.

The readout circuit 13 performs, for example, amplification and analog-to-digital (AD) conversion of pixel signals, and output data output from the readout circuit 13 is input to the machine learning portion 7. The machine learning portion 7 performs the above-mentioned processing on the output data input from the readout circuit 13. The data obtained by machine learning processing is output via the output interface portion 8 and the output pads OP.

FIG. 3 is a sectional schematic view taken along line X-X' illustrated in FIGS. 1A to 1C. FIG. 3 illustrates structures of the pixel array portion 1A, the heat dissipation portion 3, and the pads 4 of the first substrate 2 and structures of corresponding portions of the second substrate 5. The first substrate 2 and the second substrate 5 have a structure in which a semiconductor layer 301 and a semiconductor layer 315 are stacked on each other via a plurality of wiring layers and insulating films.

Photoelectric conversion portions are arranged in the semiconductor layer 301, which is located on the light entrance surface side of the first substrate 2. Moreover, microlenses 307 are arranged, which condense light, are arranged on the light entrance surface side of the pixel array portion 1A of the first substrate 2. The semiconductor layer 301 has a transistor region 308, in which sources and drains of transistors are arranged. An interlayer insulating film 302 includes a gate electrode 310 for transistors, a wiring layer 312, and a contact plug 311, which interconnects the transistor region 308 and the wiring layer 312. A plurality of interlayer insulating films 303, 304, and 305 is stacked on each other between the interlayer insulating film 302 and a junction surface 306 between the first substrate 2 and the second substrate 5.

The interlayer insulating film 303 includes a wiring layer 314 and a via plug 313, which interconnects the wiring layer 314 and the wiring layer 312, and the interlayer insulating film 304 has a configuration similar to that of the interlayer insulating film 303. The interlayer insulating film 305 includes, in addition to a wiring layer and a via plug, a wiring pattern 321, which constitutes a metal joining portion MB. The metal joining portion MB is connected to a wiring pattern of the wiring layer adjacent thereto and is thus able to dissipate heat generated at the machine learning portion 7. While, in FIG. 3, the wiring pattern 321 and a wiring pattern of a layer situated upper than the wiring pattern 321 are interconnected via a via plug, such wiring patterns can be interconnected without via a via plug. The metal joining portion MB can be configured by the wiring pattern 321, which is formed with the same layer as the wiring layer included in the interlayer insulating film 305, and a wiring pattern 322, which is formed with the same layer as the wiring layer included in an interlayer insulating film 319, being joined to each other.

The second substrate 5 also has a layered structure similar to that of the first substrate 2. The semiconductor layer 315 includes a transistor region 320, which includes sources and drains. Transistors included in the transistor region 320 are transistors which constitute the machine learning portion 7.

An interlayer insulating film 316 includes a gate electrode, a wiring layer, and a contact plug as with the interlayer insulating film 302. A plurality of interlayer insulating films 317, 318, and 319 is stacked on each other between the interlayer insulating film 316 and the junction surface 306. Each of the interlayer insulating films 317 and 318 includes a wiring layer and a via plug as with each of the interlayer insulating films 303 and 304, and the interlayer insulating film 319 includes a wiring pattern 322, which constitutes a wiring layer, a via plug, and a metal joining portion MB, as with the interlayer insulating film 305. The forming layers and configuration of the wiring pattern 322 are similar to those of the wiring pattern 321.

It is favorable that, as illustrated in FIG. 3, a plurality of metal joining portions MB is connected to the same wiring pattern. This enables securing the area of a wiring pattern to which a plurality of metal joining portions MB is connected, and, therefore, enables increasing heat dissipation routes.

It is favorable that the wiring pattern to which a plurality of metal joining portions MB is connected constitutes electrodes of the pads 4. In other words, it is favorable that the wiring pattern to which a plurality of metal joining portions MB is connected extends to openings of the pads 4 and the wiring pattern and an external circuit are interconnected via, for example, bonding wires.

It is favorable that, at positions overlapping the openings of the pads 4 in planar view, the wiring pattern constituting the pads 4 and the wiring pattern included in the interlayer insulating film 318 are interconnected via a metal joining portion MB2. This enables increasing the volume of a wiring such as a wiring pattern which is connected to a metal joining portion MB1 connected to the machine learning portion 7, and, therefore, enables increasing the thermal capacity.

As illustrated in FIG. 3, in the first exemplary embodiment, the heat dissipation portion 3, which includes a metal joining portion MB connected to a wiring pattern located in adjacent interlayer insulating films, is located at a position overlapping the machine learning portion 7. The pixel array portion 1A and the machine learning portion 7 are located at respective positions not overlapping each other in planar view. Suppose a case where, when the first substrate 2 and the second substrate 5 are joined to each other via a metal joining portion MB, the pixel array portion 1A and the machine learning portion 7 are located in such a way as to overlap each other in planar view. In this case, heat generated at the machine learning portion 7 is transmitted to the pixel array portion 1A, so that noise such as dark current noise may occur in image capturing pixels and the image quality may decrease. On the other hand, according to the first exemplary embodiment, since the pixel array portion 1A and the machine learning portion 7 are located at respective positions not overlapping each other in planar view, heat generated at the machine learning portion 7 becomes unlikely to propagate to the pixel array portion 1A. Accordingly, it is possible to prevent or reduce a decrease in image quality.

In the first substrate 2, it is favorable that a wiring pattern 314-1 included in the heat dissipation portion 3 is also connected to the semiconductor layer 301 via a via plug and a wiring layer. This enables increasing exhaust heat routes for heat generated at the machine learning portion 7. In the heat dissipation portion 3, it is favorable that a plurality of metal joining portions MB1 is connected to the wiring pattern 314-1. On the other hand, if heat generated at the machine learning portion 7 is exhausted to the vicinity of photoelectric conversion portions, a decrease in image quality may be caused. Accordingly, it is favorable that, in the case of being connected to the semiconductor layer 301, the wiring pattern 314-1 is connected to the semiconductor layer 301 at a position nearer to the pads 4 than to the pixel array portion 1A. Moreover, in the heat dissipation portion 3, it is favorable that the number of contact plugs connected to the semiconductor layer 301 is smaller than the number of metal joining portions MB1.

A transistor region 309 may be arranged in the semiconductor layer 301, and the transistor region 309 and the wiring pattern 314-1 may be interconnected. The transistor region 309 can be made to have a configuration similar to that of transistors arranged in the pixel array portion 1A. As illustrated in FIG. 3, a capacity portion is arranged in the transistor region 309 of the heat dissipation portion 3. The capacity portion is, for example, a bypass capacitor. The bypass capacitor includes a substrate bias portion, a semiconductor region, and a gate electrode. In FIG. 3, the gate electrode and the semiconductor region are illustrated out of the bypass capacitor.

Furthermore, the capacity portion can be, for example, a coupling capacity provided between signal lines.

According to the first exemplary embodiment, as described above, it is possible to make heat generated at the machine learning portion 7 unlikely to propagate to the pixel array portion 1A and, thus, it is possible to reduce image quality degradation.

Figure 4A:
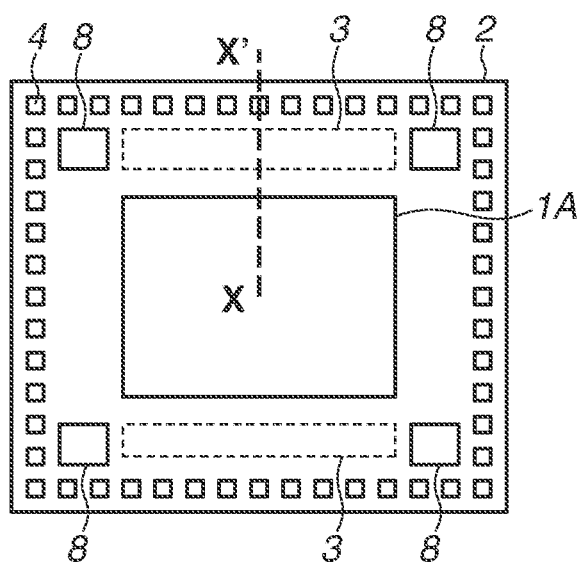
FIGS. 4A and 4B are plan views of a photoelectric conversion device in a second exemplary embodiment.
Figure 4B:
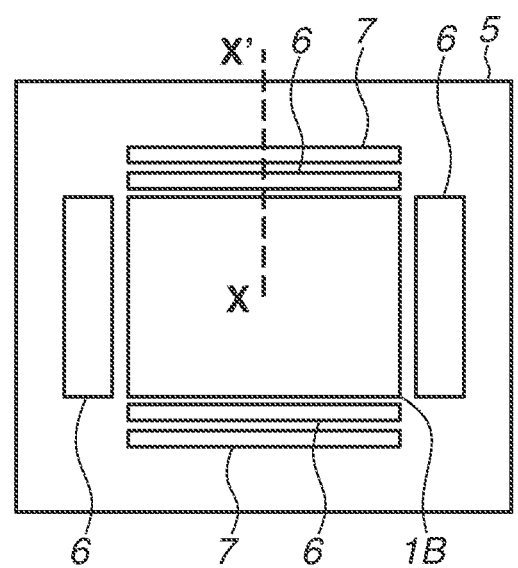

A photoelectric conversion device according to a second exemplary embodiment is described with reference to FIGS. 4A and 4B and FIG. 5. FIG. 4A is a schematic plan view of the first substrate 2 as viewed from the light entrance surface side, and FIG. 4B is a schematic plan view of the second substrate 5 as viewed from the light entrance surface side. The photoelectric conversion device according to the second exemplary embodiment differs in the locations of the heat dissipation portion 3 and the output interface portion 8 from those in the first exemplary embodiment. Moreover, the second exemplary embodiment differs from the first exemplary embodiment in that the wiring pattern 314-1 is not connected to the semiconductor layer 301. Since other than these points and issues described below are substantially similar to those in the first exemplary embodiment, constituent components similar to those in the first exemplary embodiment are assigned the respective same reference characters as those in the first exemplary embodiment and any duplicate description thereof may be omitted.

As illustrated in FIG. 4A, the pixel array portion 1A of the first substrate 2 includes a plurality of pixels arranged in a matrix shape in such a way as to have a longitudinal direction and a transverse direction. Then, in the second exemplary embodiment, the heat dissipation portion 3 is located along sides in the longitudinal direction (long sides) which constitute the outer edge of the pixel array portion 1A.

In FIG. 4A, the heat dissipation portion 3 is located along two long sides of the pixel array portion 1A.

Moreover, in the second exemplary embodiment, the output interface portion 8 is located in the first substrate 2. Then, the output interface portion 8 is not located in the second substrate 5. As illustrated in FIGS. 4A and 4B, the output interface portion 8 can be arranged in the first substrate 2 due to limitations of location areas of the readout circuit portion 6 and the machine learning portion 7. The output interface portion 8 can be arranged at four corners of sides which constitute the outer edge of a chip of the first substrate 2.

Figure 5:
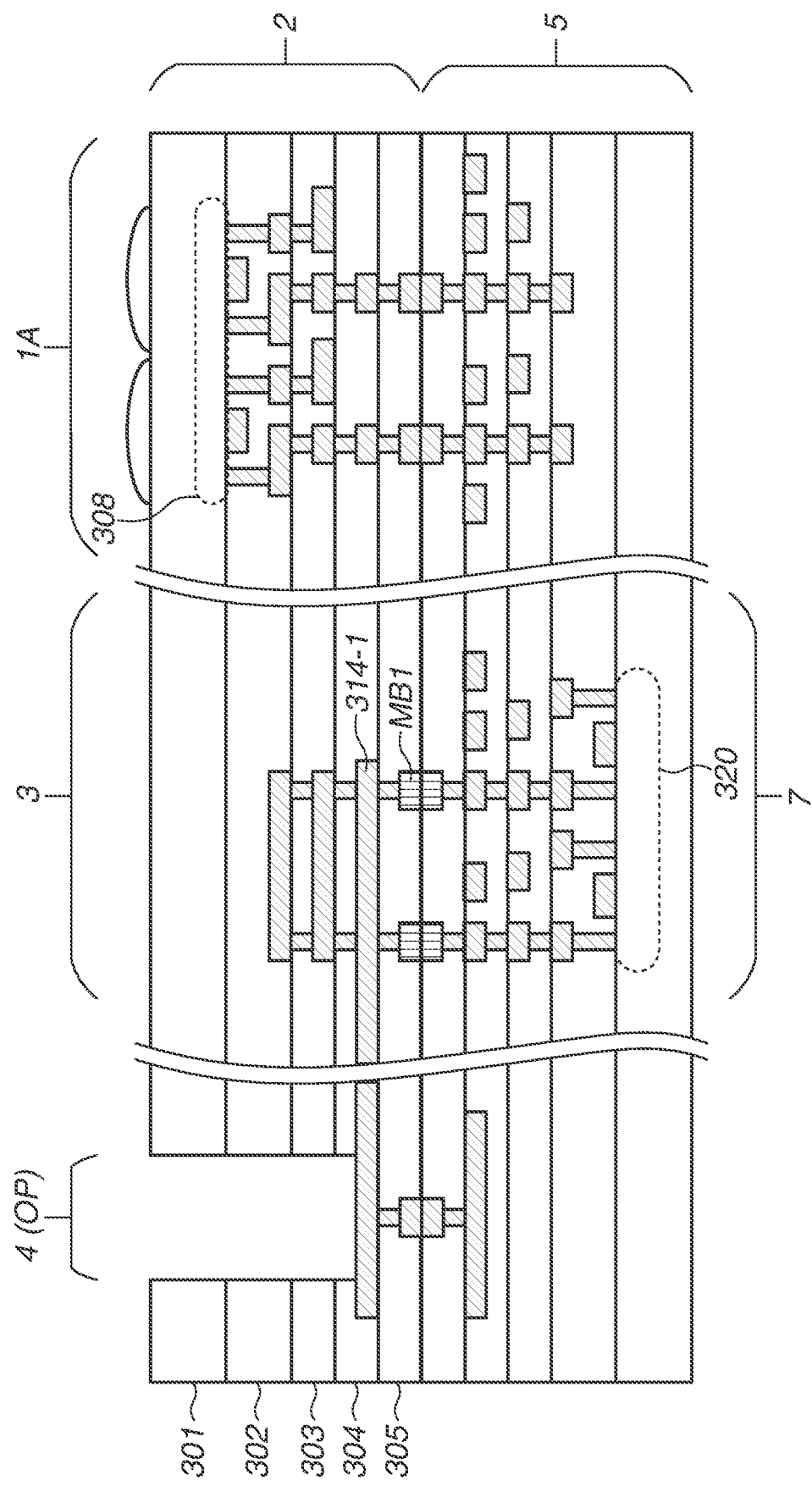
FIG. 5 is a sectional schematic view of the photoelectric conversion device in the second exemplary embodiment.

FIG. 5 is a sectional schematic view taken along line X-X' illustrated in FIGS. 4A and 4B. FIG. 5 illustrates structures of the pixel array portion 1A, the heat dissipation portion 3, and the pads 4 of the first substrate 2 and structures of corresponding portions of the second substrate 5. As mentioned above, in the second exemplary embodiment, in the heat dissipation portion 3, the wiring pattern 314-1, which is connected to the metal joining portion MB1 connected to the machine learning portion 7, is not connected to the semiconductor layer 301. Thus, the metal joining portion MB1 is connected to only wiring patterns and via plugs of the respective wiring layers. The wiring patterns can jointly constitute a metal insulator metal (MIM) capacitance.

Even according to the second exemplary embodiment, as with the first exemplary embodiment, it is possible to make heat generated at the machine learning portion 7 unlikely to propagate to the pixel array portion 1A and, thus, it is possible to reduce image quality degradation.

Figure 6A:
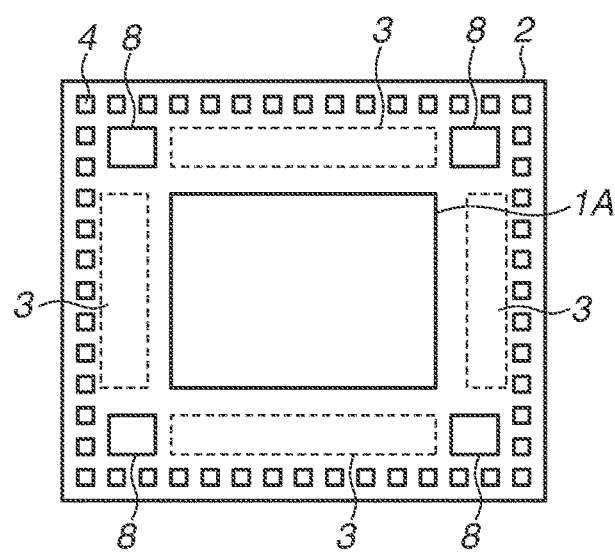
FIGS. 6A and 6B are plan views of a photoelectric conversion device in a third exemplary embodiment.
Figure 6B:
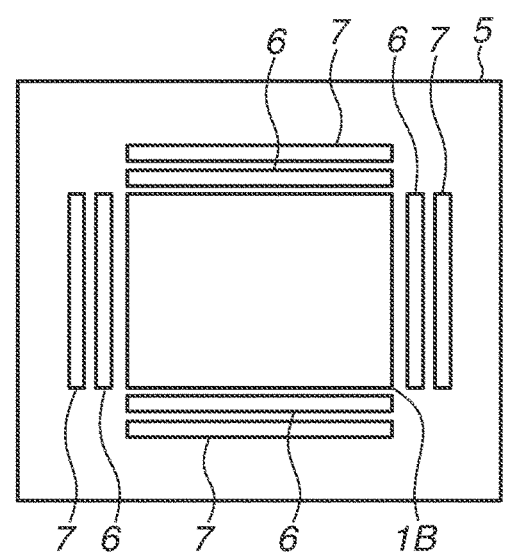

A photoelectric conversion device according to a third exemplary embodiment is described with reference to FIGS. 6A and 6B. FIG. 6A is a schematic plan view of the first substrate 2 as viewed from the light entrance surface side, and FIG. 6B is a schematic plan view of the second substrate 5 as viewed from the light entrance surface side. The photoelectric conversion device according to the third exemplary embodiment differs in the locations of the heat dissipation portion 3, the readout circuit portion 6, and the machine learning portion 7 from those in the second exemplary embodiment. Since other than these points and issues described below are substantially similar to those in the second exemplary embodiment, constituent components similar to those in the second exemplary embodiment are assigned the respective same reference characters as those in the second exemplary embodiment and any duplicate description thereof may be omitted.

As illustrated in FIG. 6, the heat dissipation portion 3 is located along four sides of the pixel array portion 1A of the first substrate 2. Moreover, as illustrated in FIG. 6B, in the second substrate 5, the readout circuit portion 6 and the machine learning portion 7 are located along four sides of the pixel circuit portion 1B. The heat dissipation portion 3, which is located in the first substrate 2, is located at a position overlapping the machine learning portion 7 in planar view. A cross-section structure through which heat generated at the machine learning portion 7 is dissipated at the pads 4 via the heat dissipation portion 3 is similar to that in the second exemplary embodiment and is, therefore, omitted from description.

Moreover, locating the heat dissipation portion 3 along four sides of the pixel array portion 1A enables increasing exhaust heat routes.

A photoelectric conversion device according to a fourth exemplary embodiment is described with reference to FIGS. 7A and 7B. FIG. 7A is a schematic plan view of the first substrate 2 as viewed from the light entrance surface side, and FIG. 7B is a schematic plan view of the second substrate 5 as viewed from the light entrance surface side. The photoelectric conversion device according to the fourth exemplary embodiment differs in the locations of the heat dissipation portion 3, the readout circuit portion 6, and the machine learning portion 7, which are located in the first substrate 2 and the second substrate 5, from those in the first exemplary embodiment. Since other than these points and issues described below are substantially similar to those in the first exemplary embodiment, constituent components similar to those in the first exemplary embodiment are assigned the respective same reference characters as those in the first exemplary embodiment and any duplicate description thereof may be omitted.

As illustrated in FIG. 7A, in the first substrate 2, the heat dissipation portion 3 is located along two sides which constitute the short sides of the pixel array portion 1A, and the readout circuit portion 6 is located along two sides which constitute the long sides of the pixel array portion 1A. Moreover, the readout circuit portion 6 is divisionally located in the first substrate 2 and the second substrate 5. For example, an analog-to-digital (AD) conversion portion of the readout circuit portion 6 can be located in the second substrate 5 and an output portion thereof can be located in the first substrate 2.

As illustrated in FIG. 7B, the heat dissipation portion 3 is located at a position planarly overlapping the machine learning portion 7, which is located in the second substrate 5. A cross-section structure through which heat generated at the machine learning portion 7 is dissipated at the pads 4 via the heat dissipation portion 3 is similar to that in the first exemplary embodiment and is, therefore, omitted from description.

Even according to the fourth exemplary embodiment, as with the first exemplary embodiment, it is possible to make heat generated at the machine learning portion 7 unlikely to propagate to the pixel array portion 1A and, thus, it is possible to reduce image quality degradation.

Figure 8:
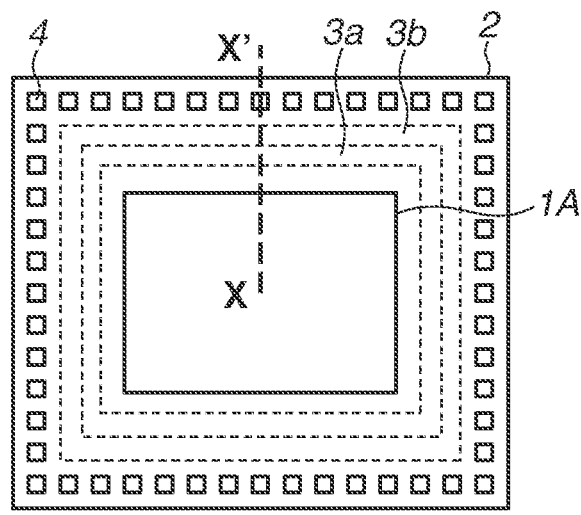
FIG. 8 is a plan view of a photoelectric conversion device in a fifth exemplary embodiment.
Figure 9:
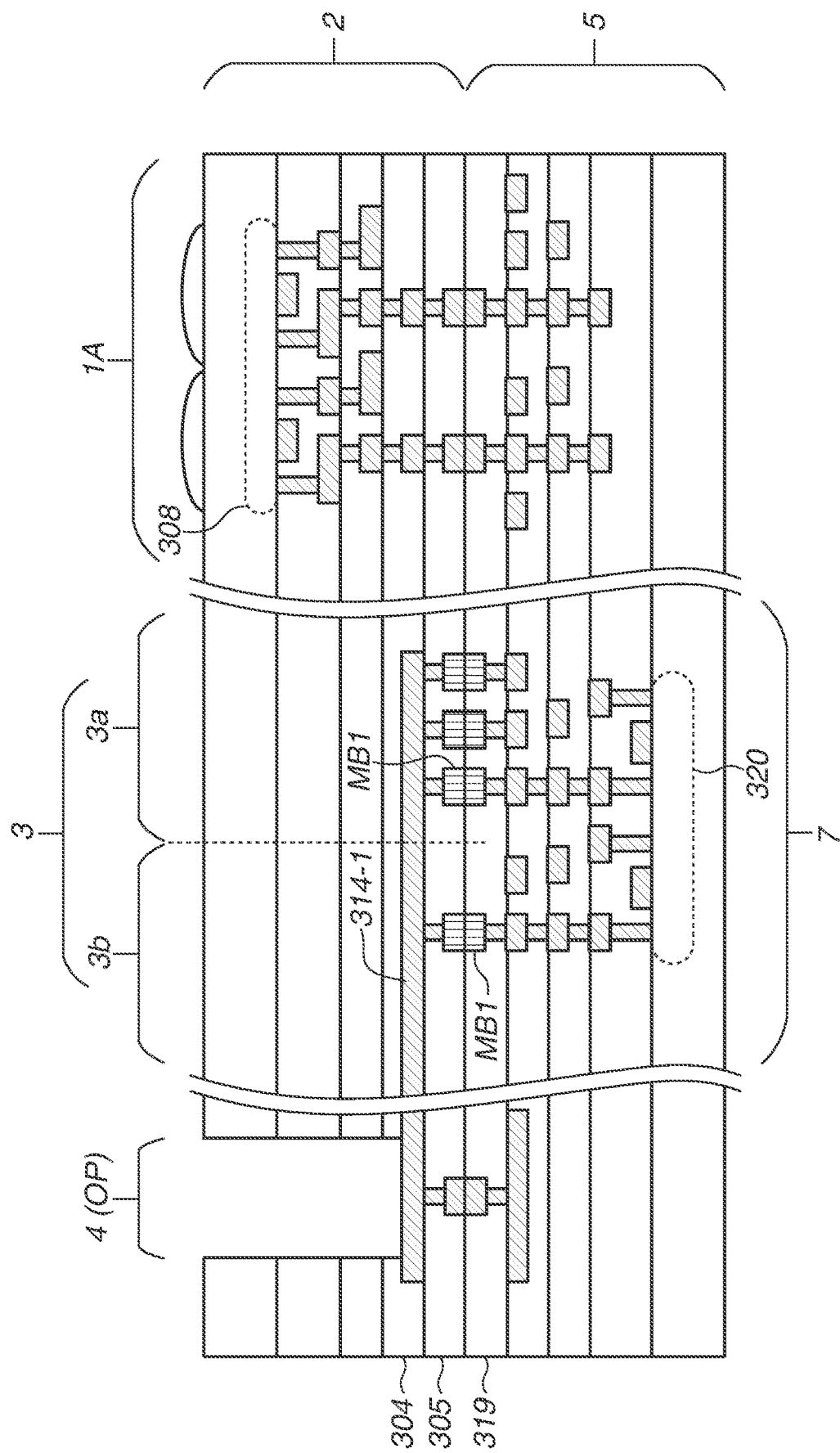
FIG. 9 is a sectional schematic view of the photoelectric conversion device in the fifth exemplary embodiment.

A photoelectric conversion device according to a fifth exemplary embodiment is described with reference to FIG. 8 and FIG. 9. FIG. 8 is a schematic plan view of the first substrate 2 as viewed from the light entrance surface side. Moreover, FIG. 9 is a sectional schematic view taken along line X-X' illustrated in FIG. 8. The fifth exemplary embodiment differs from the first exemplary embodiment in the density of heat dissipation structures included in the heat dissipation portion 3, which is located in the first substrate 2. For example, FIG. 8 and FIG. 9 illustrate an example in which there is a difference in the density of metal joining portions MB1. Since other than these points and issues described below are substantially similar to those in the first exemplary embodiment, constituent components similar to those in the first exemplary embodiment are assigned the respective same reference characters as those in the first exemplary embodiment and any duplicate description thereof may be omitted.

Depending on a configuration of the machine learning portion 7, heat dissipation structures such as metal joining portions MB1 may be unable to be evenly located due to limitations of wiring density. In this case, it is favorable to heighten the heat dissipation property of a heat dissipation structure located close to a heat generation source in the machine learning portion 7. In the fifth exemplary embodiment, in the heat dissipation portion 3, the heat dissipation property in the heat dissipation portion 3 is made to differ between a first region 3b and a second region 3a, which is located between the first region 3b and the pixel array portion 1A. For example, in a case where, in the machine learning portion 7, the amount of heat generation is larger in a region close to the pixel array portion 1A than in a region far from the pixel array portion 1A, the number of metal joining portions MB1 in the second region 3a is made larger than the number of metal joining portions MB1 in the first region 3b, so that the heat dissipation property of the second region 3a is made higher than the heat dissipation property of the first region 3b. In this way, the heat dissipation characteristics of the heat dissipation portion 3 can be changed according to the amount of heat generation of the machine learning portion 7.

Moreover, to cause a circuit to operate in a stable manner, it is favorable that the temperature of a substrate is homogeneous. Accordingly, the heat dissipation characteristics of heat dissipation structures can be changed in such a manner that the distribution of temperatures is made homogeneous between a region overlapping the heat dissipation portion 3 and a region not overlapping the heat dissipation portion 3. For example, the number of metal joining portions MB1 in a region in which the amount of heat generation is large can be made larger than the number of metal joining portions MB1 in a region in which the amount of heat generation is small.

Even according to the fifth exemplary embodiment, as with the first exemplary embodiment, it is possible to make heat generated at the machine learning portion 7 unlikely to propagate to the pixel array portion 1A and, thus, it is possible to reduce image quality degradation. Moreover, according to the fifth exemplary embodiment, it is possible to change the heat dissipation property according to the amount of heat generation of the machine learning portion 7 and, thus, it is possible to reduce the unevenness of the distribution of temperatures in the second substrate 5.

A photoelectric conversion device according to a sixth exemplary embodiment is described with reference to FIGS. 10A and 10B and FIG. 11.

Figure 10A:
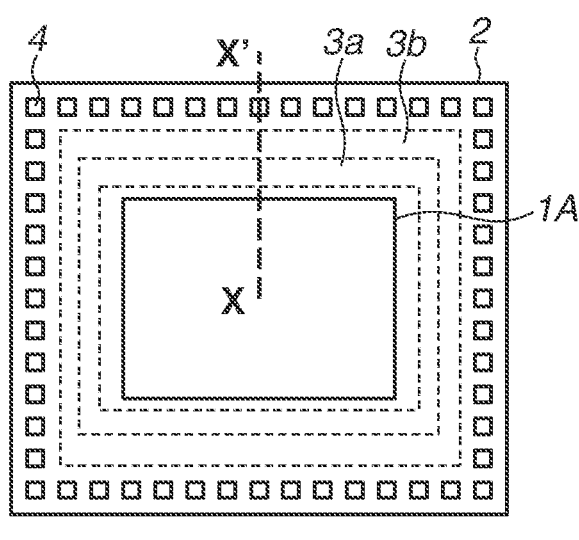
FIGS. 10A and 10B are plan views of a photoelectric conversion device in a sixth exemplary embodiment.
Figure 10B:
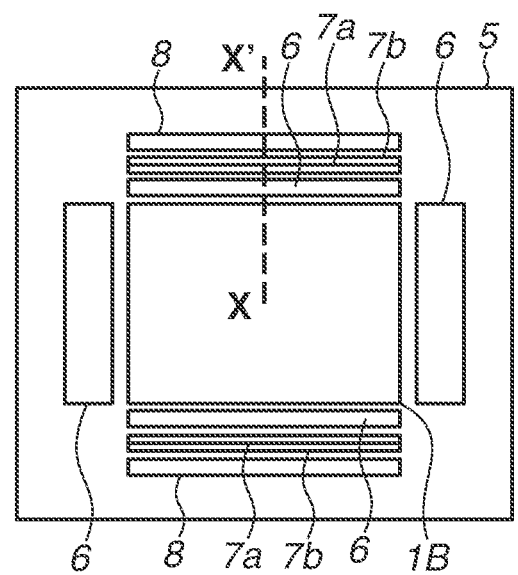
Figure 11:
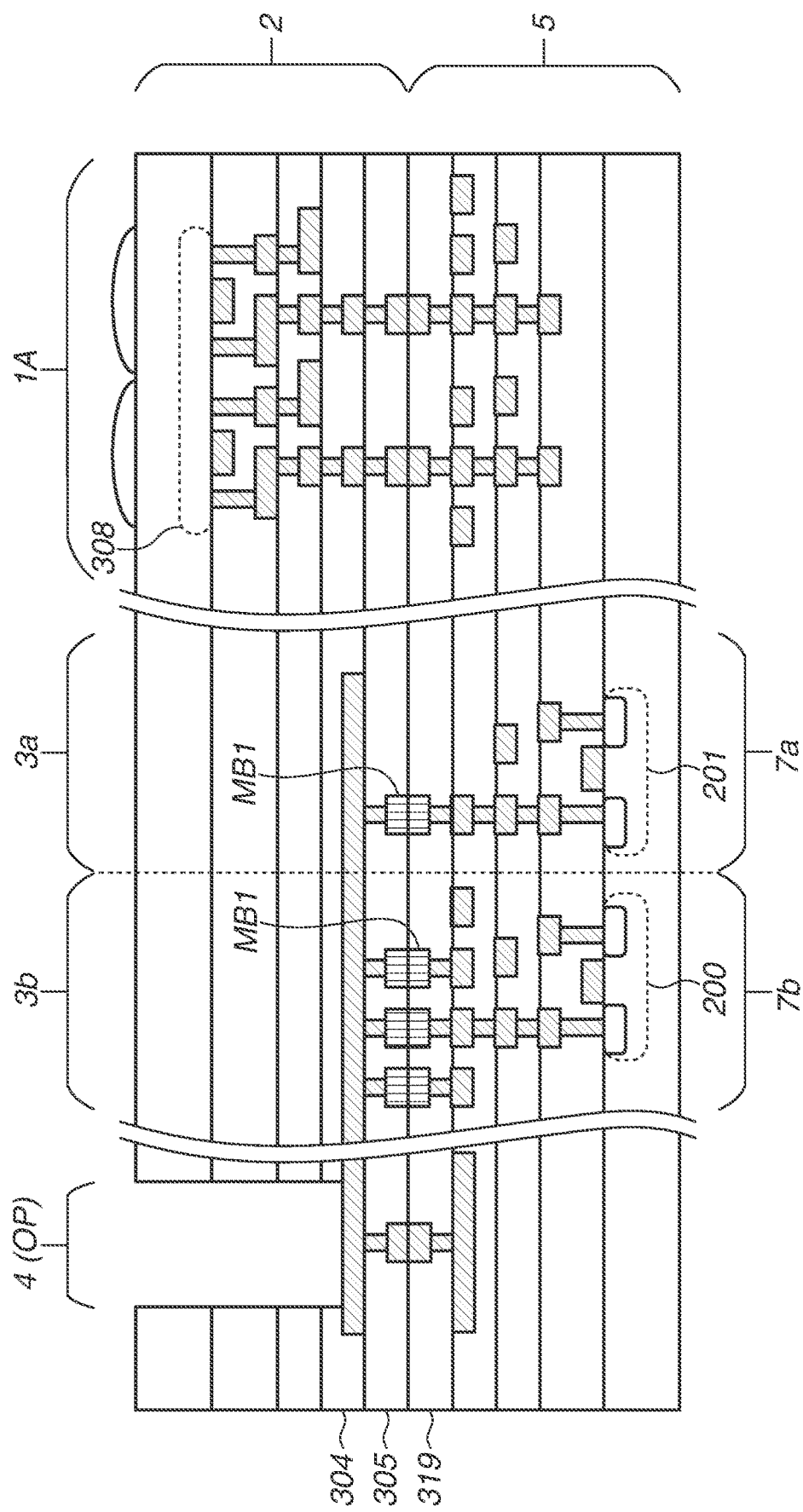
FIG. 11 is a sectional schematic view of the photoelectric conversion device in the sixth exemplary embodiment.

FIG. 10A is a schematic plan view of the first substrate 2 as viewed from the light entrance surface side, and FIG. 10B is a schematic plan view of the second substrate 5 as viewed from the light entrance surface side. Moreover, FIG. 11 is a sectional schematic view taken along line X-X' illustrated in FIGS. 10A and 10B. The sixth exemplary embodiment differs from the first exemplary embodiment in that a plurality of heat dissipation portions (regions 3a and 3b) different in structure is located and a plurality of machine learning portions (circuits 7a and 7b) different in operation speed is located in the second substrate 5. Since other than these points and issues described below are substantially similar to those in the first exemplary embodiment, constituent components similar to those in the first exemplary embodiment are assigned the respective same reference characters as those in the first exemplary embodiment and any duplicate description thereof may be omitted.

As illustrated in FIG. 10A, in the first substrate 2, the heat dissipation portion (second region 3a) and the heat dissipation portion (first region 3b) are located at positions surrounding the pixel array portion 1A. Moreover, as illustrated in FIG. 10B, the machine learning portion 7 in the second substrate 5 includes a first circuit 7b, which operates at a first operation speed, and a second circuit 7a, which operates at an operation speed higher than the first operation speed of the first circuit 7b. In the second substrate 5, the first circuit 7b of the machine learning portion 7 is located at a position overlapping the first region 3b of the heat dissipation portion 3, and the second circuit 7a of the machine learning portion 7 is located at a position overlapping the second region 3a of the heat dissipation portion 3.

The first region 3b is made higher in the heat dissipation property of heat dissipation structures than the second region 3a. For example, in FIG. 11, the number of metal joining portions MB1 in the first region 3b is made larger than the number of metal joining portions MB1 in the second region 3a. In other words, the density of metal joining portions MB1 in the first region 3b is made higher than the density of metal joining portions MB1 in the second region 3a.

The first circuit 7b of the machine learning portion 7 operates at a higher speed than the second circuit 7a and is, therefore, expected to be higher in the influence of heat generation than the second circuit 7a. Therefore, a heat dissipation effect is heightened by locating the first circuit 7b at a position farther from the pixel array portion 1A than a region in which the second circuit 7a is located and heightening the location density of heat dissipation structures located in the heat dissipation portion (first region 3b) overlapping the first circuit 7b. This facilitates preventing or reducing heat generated at the first circuit 7b and the second circuit 7a of the machine learning portion 7 from propagating to the pixel array portion 1A.

Even according to the sixth exemplary embodiment, as with the first exemplary embodiment, it is possible to make heat generated at the machine learning portion 7 unlikely to propagate to the pixel array portion 1A and, thus, it is possible to reduce image quality degradation. Moreover, according to the sixth exemplary embodiment, it is possible to change the heat dissipation property according to the amount of heat generation of the machine learning portion 7 and, thus, it is possible to conspicuously obtain an effect of reducing image quality degradation.

Figure 12:
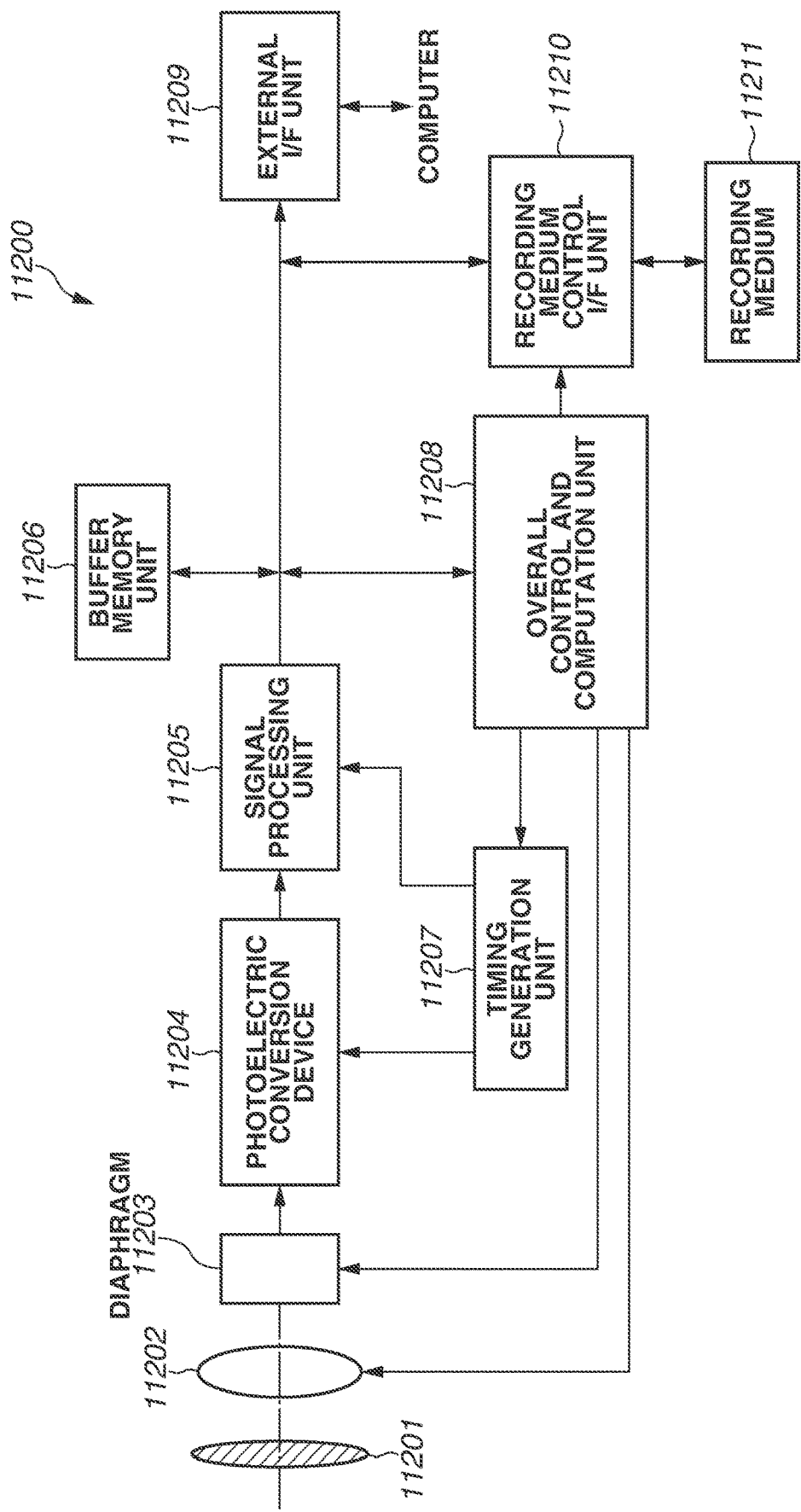
FIG. 12 is a functional block diagram of a photoelectric conversion system in a seventh exemplary embodiment.

A photoelectric conversion system 11200 according to a seventh exemplary embodiment is described with reference to FIG. 12. FIG. 12 is a block diagram illustrating a configuration of the photoelectric conversion system 11200 according to the seventh exemplary embodiment.

The photoelectric conversion system 11200 according to the seventh exemplary embodiment includes a photoelectric conversion device 11204. Here, any one of the photoelectric conversion devices described in the above-described exemplary embodiments can be applied to the photoelectric conversion device 11204. The photoelectric conversion system 11200 can be used as, for example, an image capturing system. Specific examples of the image capturing system include a digital still camera, a digital camcorder, a monitoring camera, and a network camera. FIG. 12 illustrates an example of a digital still camera as the photoelectric conversion system 11200.

The photoelectric conversion system 11200 illustrated in FIG. 12 includes the photoelectric conversion device 11204 and a lens 11202, which forms an optical image of a subject on the photoelectric conversion device 11204. Moreover, the photoelectric conversion system 11200 includes a diaphragm 11203, which varies the amount of light passing through the lens 11202, and a barrier 11201, which is provided to cover the lens 11202. The lens 11202 and the diaphragm 11203 constitute an optical system which focuses light onto the photoelectric conversion device 11204.

The photoelectric conversion system 11200 includes a signal processing unit 11205, which performs processing of an output signal output from the photoelectric conversion device 11204. The signal processing unit 11205 performs an operation of signal processing for performing various correction and compression operations on the input signal as appropriate and outputting the processed signal. The photoelectric conversion system 11200 further includes a buffer memory unit 11206, which temporarily stores image data, and an external interface unit (external I/F unit) 11209, which is used to perform communication with, for example, an external computer. Additionally, the photoelectric conversion system 11200 includes a recording medium 11211, such as a semiconductor memory, which is used to perform recording and readout of captured image data, and a recording medium control interface unit (recording medium control I/F unit) 11210, which is used to perform recording and readout with respect to the recording medium 11211. The recording medium 11211 can be incorporated in the photoelectric conversion system 11200 or can be configured to be attachable to and detachable from the photoelectric conversion system 11200. Moreover, communications from the recording medium control I/F unit 11210 to the recording medium 11211 or communications from the external I/F unit 11209 can be performed by wireless.

Additionally, the photoelectric conversion system 11200 includes an overall control and computation unit 11208, which performs various computing operations and controls the entire digital still camera, and a timing generation unit 11207, which outputs various timing signals to the photoelectric conversion device 11204 and the signal processing unit 11205. Here, for example, timing signals can be input from an external apparatus, and the photoelectric conversion system 11200 is to include at least the photoelectric conversion device 11204 and the signal processing unit 11205, which processes an output signal output from the photoelectric conversion device 11204. The overall control and computation unit 11208 and the timing generation unit 11207 can be configured to execute a part or the whole of a control function for the photoelectric conversion device 11204.

The photoelectric conversion device 11204 outputs an image signal to the signal processing unit 11205. The signal processing unit 11205 performs predetermined signal processing on the image signal output from the photoelectric conversion device 11204, thus outputting image data. Moreover, the signal processing unit 11205 generates an image using the image signal. Moreover, the signal processing unit 11205 can perform distance measuring computation on a signal output from the photoelectric conversion device 11204. Furthermore, the signal processing unit 11205 or the timing generation unit 11207 can be incorporated in the photoelectric conversion device 11204. Thus, the signal processing unit 11205 or the timing generation unit 11207 can be provided in a substrate in which pixels are arranged or can be provided in a different substrate. Configuring an image capturing system using a photoelectric conversion device described in any one of the above-described exemplary embodiments enables implementing an image capturing system capable of acquiring a higher good-quality image.

Figure 13:
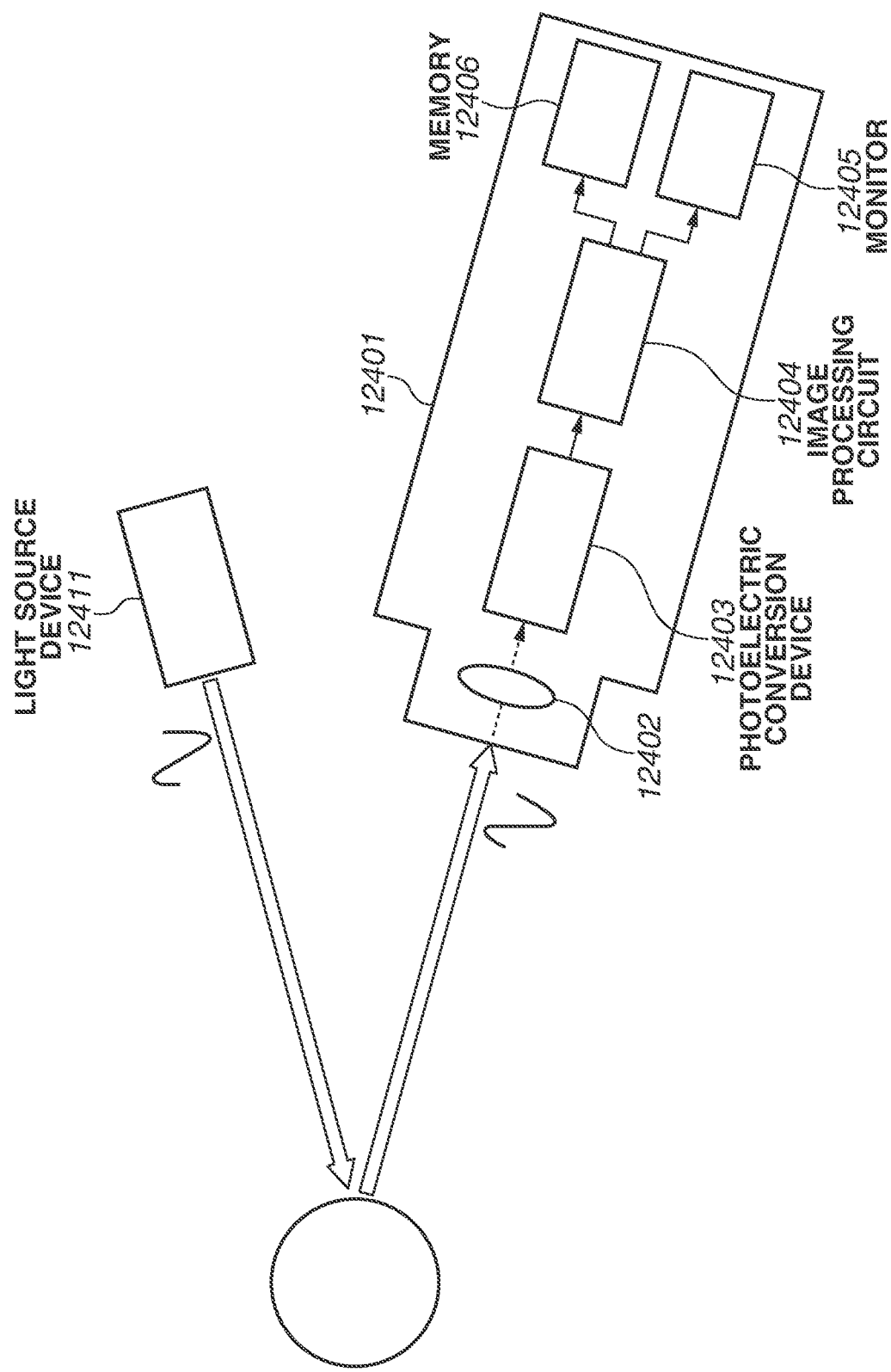
FIG. 13 is a functional block diagram of a distance sensor in an eighth exemplary embodiment.

FIG. 13 is a block diagram illustrating a configuration of a photoelectric conversion system according to an eighth exemplary embodiment using a photoelectric conversion device described in any one of the first to sixth exemplary embodiments. In FIG. 13, a configuration example of a distance image sensor 12401, which is an electronic apparatus, is illustrated as an example of the photoelectric conversion system.

As illustrated in FIG. 13, the distance image sensor 12401 is configured to include an optical system 12402, a photoelectric conversion device 12403, an image processing circuit 12404, a monitor 12405, and a memory 12406. Then, the distance image sensor 12401 is able to acquire a distance image corresponding to a distance from the distance image sensor 12401 to a subject by receiving light projected by a light source device 12411 onto the subject and then reflected from the surface of the subject (modulated light or pulsed light).

The optical system 12402, which is configured to include one or a plurality of lenses, guides image light (incident light) from a subject to the photoelectric conversion device 12403 and forms an image of the image light on the light receiving surface (sensor portion) of the photoelectric conversion device 12403.

A photoelectric conversion device described in any one of the above-described exemplary embodiments is applied as the photoelectric conversion device 12403, and a distance signal indicating a distance obtained from a received light signal output from the photoelectric conversion device 12403 is supplied to the image processing circuit 12404.

The image processing circuit 12404 performs image processing for constructing a distance image based on the distance signal supplied from the photoelectric conversion device 12403. Then, the distance image (image data), which has been obtained by such image processing, is supplied to and displayed on the monitor 12405 or is supplied to and stored (recorded) in the memory 12406.

In the distance image sensor 12401 configured in this way, applying the above-described photoelectric conversion device enables, for example, acquiring a more accurate distance image in association with an improvement in characteristics of pixels.

The technique related to the present disclosure (present technique) can be applied to various products. For example, the technique related to the present disclosure can be applied to an endoscopic surgery system.

Figure 14:
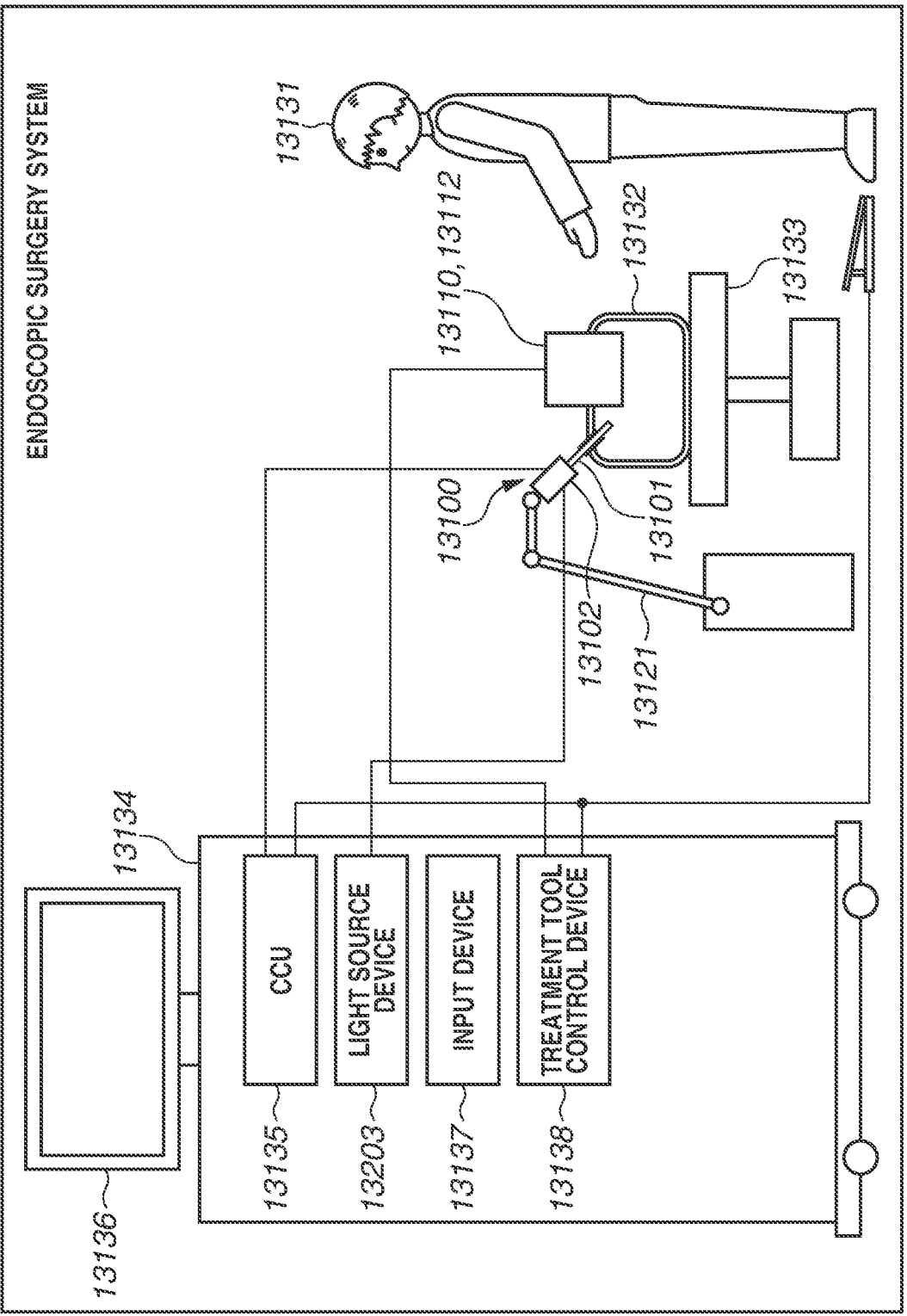
FIG. 14 is a functional block diagram of an endoscopic surgery system in a ninth exemplary embodiment.

FIG. 14 is a diagram illustrating an example of an outline configuration of an endoscopic surgery system according to a ninth exemplary embodiment, to which the technique related to the present disclosure (present technique) can be applied.

FIG. 14 illustrates a condition in which an operator (doctor) 13131 is performing an operation on a patient 13132 lying on a patient bed 13133 with use of an endoscopic surgery system 13003. As illustrated in FIG. 14, the endoscopic surgery system 13003 includes an endoscope 13100, a surgical instrument 13110, and a cart 13134, in which various devices for endoscopic surgery are mounted.

The endoscope 13100 includes a lens tube 13101, a region of which with a predetermined length from the tip thereof is configured to be inserted into a body cavity of the patient 13132, and a camera head 13102, which is connected to the base end of the lens tube 13101. While, in the example illustrated in FIG. 14, an endoscope 13100 configured as what is called a rigid endoscope having a rigid lens tube 13101 is illustrated, the endoscope 13100 can be configured as what is called a flexible endoscope having a flexible lens tube.

An opening portion in which an objective lens is fitted is provided at the tip of the lens tube 13101. A light source device 13203 is connected to the endoscope 13100, and light generated by the light source device 13203 is guided to the tip of the lens tube 13101 by a light guide mounted to extend inside the lens tube 13101. This light is radiated toward an observation object in the body cavity of the patient 13132 via the objective lens. Furthermore, the endoscope 13100 can be a direct-viewing endoscope or can be an oblique-viewing endoscope or a side-viewing endoscope.

An optical system and a photoelectric conversion device are provided inside the camera head 13102, and reflected light from an observation object (observation light) is focused on the photoelectric conversion device by the optical system. The observation light is photoelectrically converted by the photoelectric conversion device, so that an electrical signal corresponding to the observation light, i.e., an image signal corresponding to an observation image, is generated. The photoelectric conversion device to be used here includes a photoelectric conversion device described in any one of the above-described exemplary embodiments. The generated image signal is transmitted as raw data to a camera control unit (CCU) 13135.

The CCU 13135 is configured with, for example, a central processing unit (CPU) or a graphics processing unit (GPU), and comprehensively controls operations of the endoscope 13100 and a display device 13136. Additionally, the CCU 13135 receives an image signal from the camera head 13102 and performs, on the received image signal, various types of image processing for displaying an image that is based on the image signal, such as development processing (demosaicing processing).

The display device 13136 is controlled by the CCU 13135 to display an image that is based on an image signal subjected to image processing by the CCU 13135.

The light source device 13203 is configured with a light source such as a light-emitting diode (LED), and supplies, to the endoscope 13100, irradiation light used for performing image capturing of, for example, a surgical site.

An input device 13137 is an interface for the endoscopic surgery system 13003. The user is allowed to perform inputting of various pieces of information and inputting of instructions to the endoscopic surgery system 13003 via the input device 13137.

A treatment tool control device 13138 controls driving of an energy treatment tool 13112, which is used for, for example, cauterization or incision of a tissue or sealing of a blood vessel.

The light source device 13203, which supplies, to the endoscope 13100, irradiation light used for performing image capturing of a surgical site, can be configured with, for example, a white light source configured with an LED, a laser light source, or a combination of these. In a case where the white light source is configured with a combination of red-green-blue (RGB) laser light sources, since the output density and output timing of each color (each wavelength) is able to be controlled with a high degree of accuracy, the light source device 13203 is able to be operated to adjust white balance of a captured image. Moreover, in this case, respective images corresponding to R, G, and B are able to be captured in a time-division manner by radiating laser beams output from respective RGB laser light sources onto an observation object in a time-division manner and controlling driving of an image sensor of the camera head 13102 in synchronization with such radiation timing. According to this method, a color image is able to be obtained without a color filter being provided in the image sensor.

Moreover, driving of the light source device 13203 can be controlled in such a way as to change the intensity of light to be output at intervals of a predetermined time. Acquiring images in a time-division manner by controlling driving of the image sensor of the camera head 13102 in synchronization with such timing of changes of the intensity of light and then combining the images enables generating a high dynamic range image without what are called a loss of shadow detail and a loss of highlight detail.

Moreover, the light source device 13203 can be configured to be able to supply light with a predetermined wavelength band corresponding to special light observation. The special light observation uses, for example, a wavelength dependence of absorption of light in a body tissue. Specifically, image capturing of a predetermined tissue such as a blood vessel of a superficial portion of the mucous membrane is performed with a high contrast by radiating light with a band narrower than that of irradiation light used at the time of ordinary observation. Alternatively, in the special light observation, fluorescent observation, which obtains an image by fluorescence generated by radiating excitation light, can be performed. In the fluorescent observation, for example, it is possible to radiate excitation light onto a body tissue and then observe fluorescence coming from the body tissue or to locally inject a reagent such as indocyanine green (ICG) into a body tissue, radiate excitation light corresponding to a fluorescence wavelength of the reagent onto the body tissue, and then obtain a fluorescent image. The light source device 13203 can be configured to be able to supply narrow-band light and/or excitation light corresponding to such special light observation.

Figure 15A:
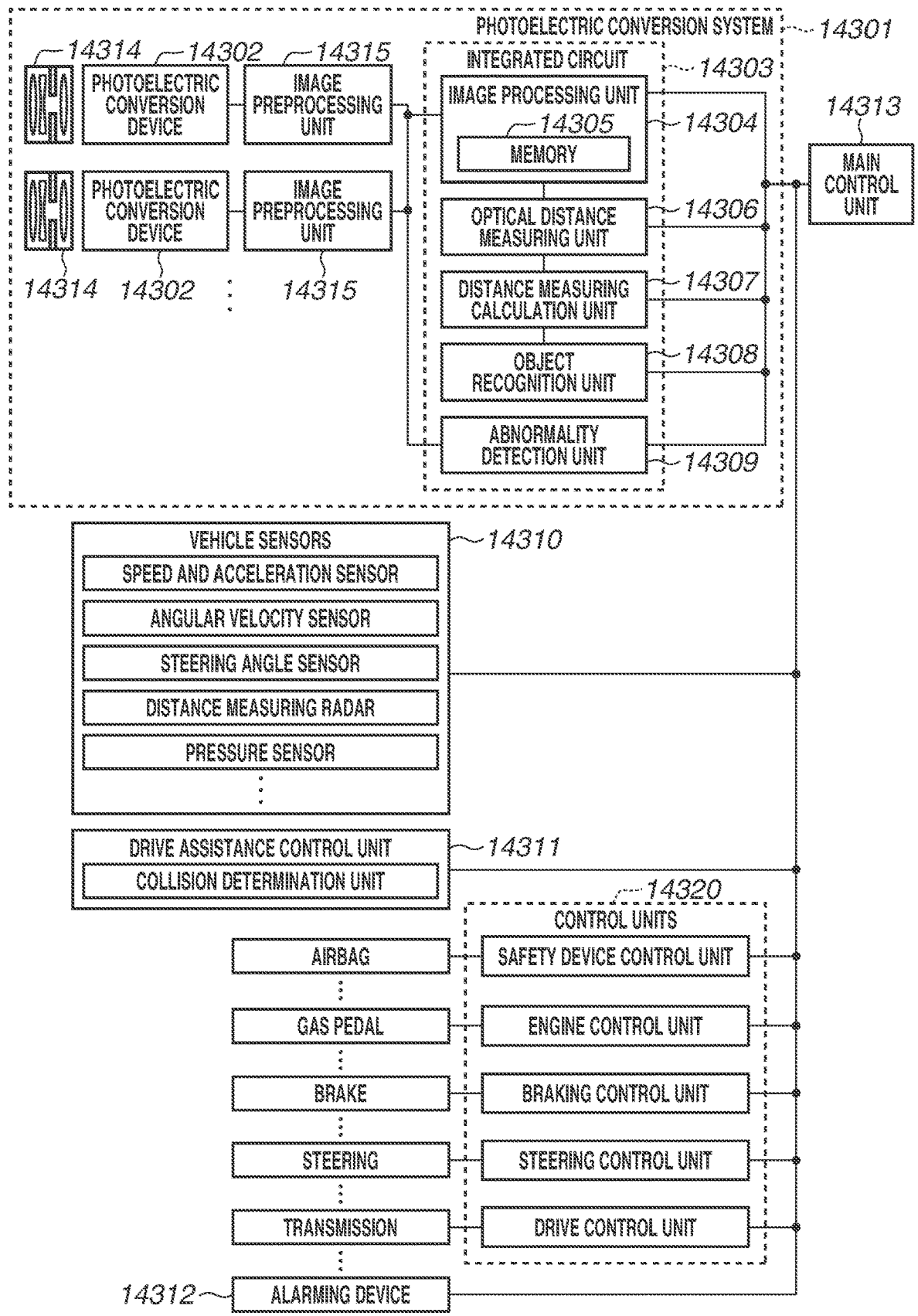

A photoelectric conversion system and a moving body according to a tenth exemplary embodiment are described with reference to FIGS. 15A and 15B. FIGS. 15A and 15B are schematic views of configuration examples of the photoelectric conversion system and the moving body according to the tenth exemplary embodiment. In the tenth exemplary embodiment, an example of a vehicle-mounted camera is illustrated as the photoelectric conversion system.

FIG. 15A is a diagram illustrating examples of a vehicle system and a photoelectric conversion system mounted in the vehicle system. The photoelectric conversion system 14301 includes photoelectric conversion devices 14302, image preprocessing units 14315, an integrated circuit 14303, and optical systems 14314. The optical system 14314 forms an optical image of a subject on the photoelectric conversion device 14302. The photoelectric conversion device 14302 converts the optical image of a subject formed by the optical system 14314 into an electrical signal. The photoelectric conversion device 14302 is a photoelectric conversion device described in any one of the above-described exemplary embodiments. The image preprocessing unit 14315 performs predetermined processing on a signal output from the photoelectric conversion device 14302. Functions of the image preprocessing unit 14315 can be incorporated in the photoelectric conversion device 14302. The photoelectric conversion system 14301 includes at least two pairs each including the optical system 14314, the photoelectric conversion device 14302, and the image preprocessing unit 14315, and is configured such that outputs from the image preprocessing units 14315 of the respective pairs are input to the integrated circuit 14303.

The integrated circuit 14303, which is an integrated circuit suitable for an image capturing system, includes an image processing unit 14304, which includes a memory 14305, an optical distance measuring unit 14306, a distance measuring calculation unit 14307, an object recognition unit 14308, and an abnormality detection unit 14309. The image processing unit 14304 performs image processing, such as development processing or defect correction, on signals output from the image preprocessing units 14315. The memory 14305 performs temporary storage of a captured image and stores defect positions of image capturing pixels. The optical distance measuring unit 14306 performs focusing on a subject and distance measurement. The distance measuring calculation unit 14307 performs calculation of distance measuring information from a plurality of pieces of image data acquired by a plurality of photoelectric conversion devices 14302. The object recognition unit 14308 performs recognition of a subject, such as a car, road, a mark, and a person. The abnormality detection unit 14309 is configured to detect abnormality of the photoelectric conversion device 14302 and then notify a main control unit 14313 of the detected abnormality.

The integrated circuit 14303 can be implemented by exclusively designed hardware, can be implemented by software modules, or can be implemented by a combination of these. Moreover, the integrated circuit 14303 can be implemented by, for example, a field-programmable gate array (FPGA) or an application specific integrated circuit (ASIC) or can be implemented by a combination of these.

The main control unit 14313 comprehensively controls operations of, for example, the photoelectric conversion system 14301, vehicle sensors 14310, and control units 14320. There can be employed a method in which, without the main control unit 14313 being provided, the photoelectric conversion system 14301, the vehicle sensors 14310, and the control units 14320 have respective communication interfaces and individually perform transmission and reception of respective control signals via a communication network (for example, the Controller Area Network (CAN) standard).

The integrated circuit 14303 has the function of receiving a control signal from the main control unit 14313 or using its own control unit to transmit control signals and setting values to the photoelectric conversion devices 14302.

The photoelectric conversion system 14301 is connected to the vehicle sensors 14310, and is able to detect a one's own vehicle running condition, such as vehicle speed, yaw rate, and steering angle, an environment outside a one's own vehicle, and states of other vehicles or obstacles. The vehicle sensors 14310 can also be a distance information acquisition unit which acquires distance information about a distance from a one's own vehicle to a subject. Moreover, the photoelectric conversion system 14301 is connected to a drive assistance control unit 14311, which performs various drive assistance operations, such as automatic steering, automatic cruise, and collision prevention functions. Particularly, with regard to a collision determination function, the drive assistance control unit 14311 estimates collision with another vehicle or an obstacle and determines the presence or absence of the collision based on detection results output from the photoelectric conversion system 14301 and the vehicle sensors 14310. This enables performing avoidance control at the time of a collision being estimated and performs starting of a safety device at the time of a collision.

Moreover, the photoelectric conversion system 14301 is also connected to an alarming device 14312, which issues an alarm to the driver based on a determination result output from the collision determination unit. For example, in a case where there is a high possibility of collision as the determination result output from the collision determination unit, the main control unit 14313 performs vehicle control to avoid collision and reduce damage by, for example, applying a brake, releasing the gas pedal, or decreasing engine power. The alarming device 14312 gives warning to the user by, for example, issuing an alarm such as sound, displaying alarm information on the screen of a display unit of, for example, a car navigation system or a meter panel system, or applying a vibration to a seat belt or a steering wheel.

In the tenth exemplary embodiment, the photoelectric conversion system 14301 is used to perform image capturing of the surroundings of a vehicle, for example, the forward or backward scene thereof. FIG. 15B illustrates an example of location of the photoelectric conversion system 14301 employed in a case where the photoelectric conversion system 14301 performs image capturing of the forward scene of a vehicle.

Two photoelectric conversion devices 14302 are located at the front portion of a vehicle 14300. Specifically, a center line with respect to a forward or backward movement orientation or an outer shape (for example, vehicle width) of the vehicle 14300 is regarded as a symmetrical axis, and two photoelectric conversion devices 14302 are located in line symmetry with respect to the symmetrical axis. This configuration is favorable in performing acquisition of distance information about a distance between the vehicle 14300 and a subject target and determination of the collision probability therebetween.

Moreover, it is favorable that the photoelectric conversion devices 14302 are located at positions which do not hinder the field of view of a driver when the driver visually recognizes a situation outside the vehicle 14300 from the driver's seat. It is favorable that the alarming device 14312 is located at a position which is likely to come within the field of view of the driver.

Moreover, while, in the tenth exemplary embodiment, a control operation for preventing collision with another vehicle has been described, the tenth exemplary embodiment can also be applied to a control operation for performing autonomous driving while tracking another vehicle or a control operation for performing autonomous driving in such a way as not to run off the lane. Additionally, the photoelectric conversion system 14301 can be applied to not only a vehicle such as a car but also, for example, a moving body (moving apparatus) such as a boat or ship, an airplane, or an industrial robot. Additionally, the photoelectric conversion system 14301 can be applied to not only a moving body but also various apparatuses which use object recognition, such as an intelligent transportation system (ITS).

A photoelectric conversion device in each exemplary embodiment can be further configured to be able to acquire various pieces of information, such as distance information.

Figure 16A:
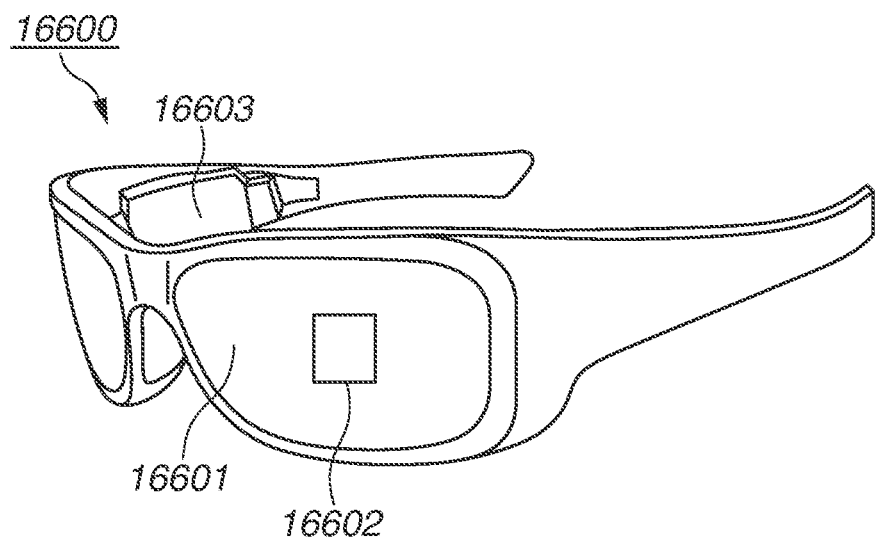
FIGS. 16A and 16B are schematic views of a photoelectric conversion system in an eleventh exemplary embodiment.

FIG. 16A is a diagram illustrating eyeglasses 16600 (smartglasses), which are an example of a photoelectric conversion system according to an eleventh exemplary embodiment. The eyeglasses 16600 include a photoelectric conversion device 16602. The photoelectric conversion device 16602 is a photoelectric conversion device described in any one of the above-described exemplary embodiments. Moreover, a display device including a light emitting device, such as an organic light-emitting diode (OLED) or a light-emitting diode (LED) can be mounted on the reverse surface side of a lens 16601. In one embodiment, only one photoelectric conversion device 16602 can be mounted or a plurality of photoelectric conversion devices 16602 can be mounted. Moreover, a plurality of types of photoelectric conversion devices can be mounted in combination. The location of the photoelectric conversion device 16602 is not limited to that illustrated in FIG. 16A.

The eyeglasses 16600 further include a control device 16603. The control device 16603 functions as a power source which supplies electric power to the photoelectric conversion device 16602 and the above-mentioned display device. Moreover, the control device 16603 controls operations of the photoelectric conversion device 16602 and the display device. An optical system for focusing light onto the photoelectric conversion device 16602 is formed in the lens 16601.

Figure 16B:
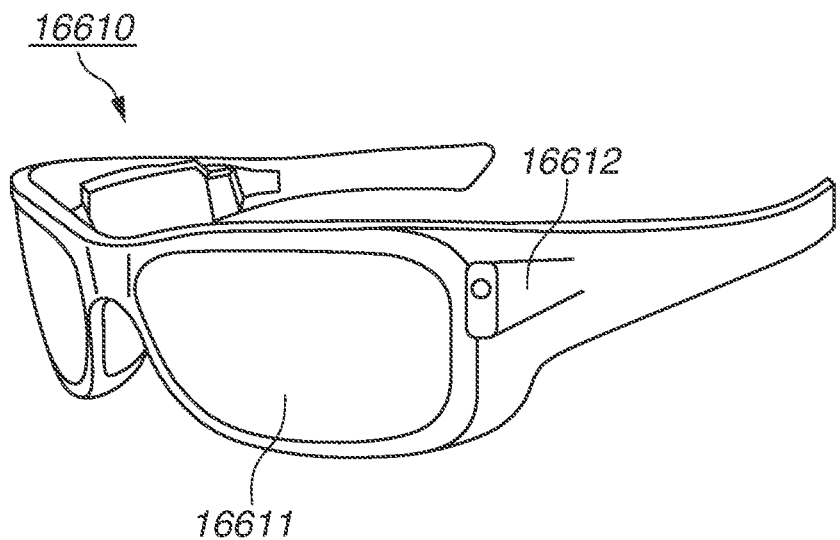

FIG. 16B illustrates eyeglasses 16610 (smartglasses), which are another example of a photoelectric conversion system according to the eleventh exemplary embodiment. The eyeglasses 16610 include a control device 16612, and a photoelectric conversion device, which is equivalent to the photoelectric conversion device 16602, and a display device are mounted in the control device 16612. The photoelectric conversion device included in the control device 16612 and an optical system for projecting light emitted from the display device are formed in a lens 16611, so that an image is projected onto the lens 16611. The control device 16612 functions as a power source which supplies electric power to the photoelectric conversion device and the display device, and controls operations of the photoelectric conversion device and the display device. The control device 16612 can include a line-of-sight detection unit. Detection of a line of sight can be performed with use of infrared light. An infrared emission unit emits infrared light to the eyeball of a user who gazes at a displayed image. Reflected light from the eyeball out of the emitted infrared light is detected by an image capturing unit including a light receiving element, so that a captured image of the eyeball is obtained. A reducing unit for reducing light traveling from the infrared emission unit to the display unit is provided, so that a decrease of the quality of an image is reduced.

A line of sight of the user on the displayed image is detected based on a captured image of the eyeball obtained by image capturing of infrared light. An optional known method can be used for line-of-sight detection using a captured image of the eyeball. For example, a line-of-sight detection method that is based on a Purkinje image formed by reflection of radiated light on the cornea can be used.

More specifically, line-of-sight detection that is based on a pupil and cornea reflection method is performed. A line-of-sight vector representing the orientation (rotational angle) of the eyeball is calculated based on an image of the pupil and a Purkinje image included in the captured image of the eyeball, so that a line of sight of the user is detected.

The display device in the eleventh exemplary embodiment can include a photoelectric conversion device including a light receiving element, and a displayed image on the display device can be controlled based on line-of-sight information about the user input from the photoelectric conversion device.

Specifically, in the display device, a first field-of-view region, which the user gazes, and a second field-of-view region, which is other than the first field-of-view region, are determined based on the line-of-sight information. The first field-of-view region and the second field-of-view region can be determined by a control device included in the display device or can be the ones received from an external control device. In a display region of the display device, the display resolution of the first field-of-view region can be controlled to be higher than the display resolution of the second field-of-view region. Thus, the display resolution of the second field-of-view region can be set lower than the display resolution of the first field-of-view region.

Moreover, the display region can include a first display region and a second display region different from the first display region, and a region higher in priority can be determined out of the first display region and the second display region based on the line-of-sight information. The first display region and the second display region can be determined by a control device included in the display device or can be the ones received from an external control device. The resolution of a region higher in priority can be controlled to be higher than the resolution of a region other than the region higher in priority. Thus, the resolution of a region relatively low in priority can be set low.

Furthermore, determination of the first field-of-view region or the region higher in priority can be performed with use of artificial intelligence (AI). AI can be a model configured to set an image of the eyeball and a direction at which the eyeball in the image actually looks as training data and estimate the angle of a line of sight and a distance to an object pointed by the line of sight based on the image of the eyeball. An AI program can be included in a display device, can be included in a photoelectric conversion device, or can be included in an external device. In a case where the AI program is included in the external device, the AI program is transmitted to the display device via communication.

In the case of performing display control based on line-of-sight detection, the eleventh exemplary embodiment can be favorably applied to smartglasses including a photoelectric conversion device which performs image capturing of an outside. The smartglasses are able to display captured external information in real time.

A photoelectric conversion system according to a twelfth exemplary embodiment is described with reference to FIG. 17. The photoelectric conversion system (hereinafter referred to as a "system") according to the twelfth exemplary embodiment can be used as, for example, a pathological diagnosis system, which is used for, for example, a doctor to diagnose a pathological lesion by observing cells or tissues picked up from a patient, or a diagnostic support system, which provides support for that. The system according to the twelfth exemplary embodiment can be configured to diagnose a pathological lesion or provide support for that based on an acquired image.

Figure 17:
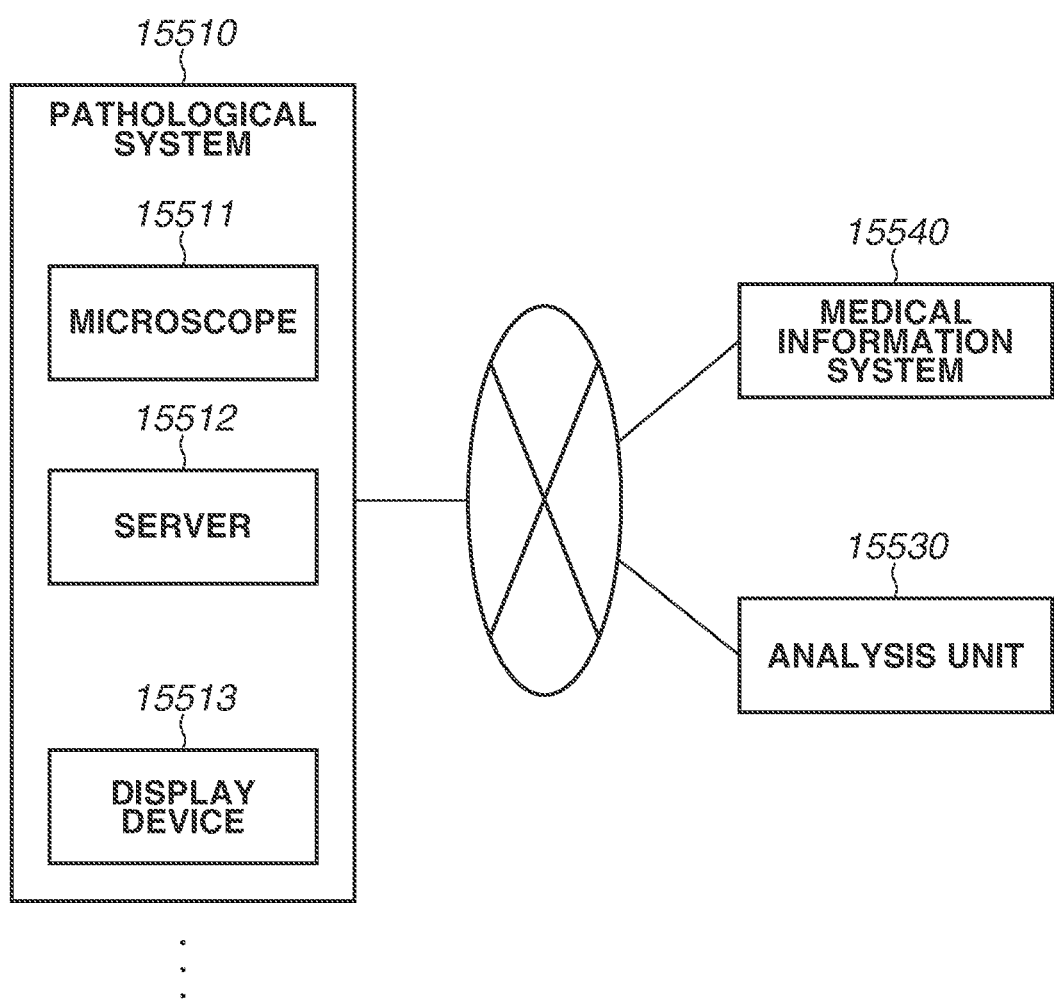
FIG. 17 is a functional block diagram of a photoelectric conversion system in a twelfth exemplary embodiment.

As illustrated in FIG. 17, the system according to the twelfth exemplary embodiment includes one or more pathological systems 15510. Additionally, the system according to the twelfth exemplary embodiment can further include an analysis unit 15530 and a medical information system 15540.

Each of the one or more pathological systems 15510 is a system which, mainly, a pathologist uses, and is introduced in, for example, a laboratory or a hospital. Each pathological system 15510 can be introduced in respective different hospitals, and is connected to the analysis unit 15530 and the medical information system 15540 via various networks, such as a wide area network and a local area network.

Each pathological system 15510 includes a microscope 15511, a server 15512, and a display device 15513.

The microscope 15511 has the function of an optical microscope, and is configured to perform image capturing of an observation object contained in a glass slide to acquire a pathological image as a digital image. The observation object is, for example, tissues or cells picked up from a patient, and can be, for example, a piece of flesh of an organ, saliva, or blood.

The server 15512 is configured to store and retain a pathological image acquired by the microscope 15511 in a storage unit (not illustrated). Moreover, upon receiving a request for view, the server 15512 is able to search for a pathological image stored in, for example, a memory and then display the found pathological image on the display device 15513. The server 15512 and the display device 15513 can be configured to operate via, for example, a device which controls displaying.

Here, in a case where the observation object is a solid object such as a piece of flesh of an organ, the observation object can be, for example, a stained piece of thin slice. The piece of thin slice can be produced by, for example, slicing up a block piece cut out from a specimen such as an organ. Moreover, at the time of slicing, the block piece can be fixed with, for example, paraffin.

The microscope 15511 can be configured to include a low-resolution image capturing unit, which performs image capturing at low resolution, and a high-resolution image capturing unit, which performs image capturing at high resolution. The low-resolution image capturing unit and the high-resolution image capturing unit can have respective different optical systems or can have the same optical system. In the case of the same optical system, the resolution of the microscope 15511 can be configured to be changed depending on image capturing targets.

The observation object is contained in, for example, a glass slide and is then placed on a stage situated within an angle of view of the microscope 15511. First, the microscope 15511 acquires an overall image within the angle of view with use of the low-resolution image capturing unit, and then identifies a region of the observation object from the acquired overall image. Next, the microscope 15511 divides a region in which the observation object is present into a plurality of divided regions each with a predetermined size, and sequentially performs image capturing of the respective divided regions with use of the high-resolution image capturing unit, thus acquiring high-resolution images of the respective divided areas. Switching of divided areas to be targeted can be performed by moving the stage, can be performed by moving an imaging optical system, or can be performed by moving both of them. Moreover, the respective divided regions can overlap between adjacent divided areas to prevent, for example, the occurrence of an image-capturing missing region caused by an unintended slippage of the glass slide. Additionally, the overall image can include identification information for associating the overall image and a patient. The identification information can be, for example, a character string or QR Code®.

The high-resolution images acquired by the microscope 15511 are input to the server 15512. The server 15512 is able to divide each high-resolution image into partial images each with a smaller size. Upon generating the partial images in this way, the server 15512 performs, on all of the partial images, composition processing for combining a predetermined number of adjacent partial images to generate one image. The composition processing can be repeated until one partial image is finally generated. With such processing performed, a partial image group having a pyramid structure in which each layer is configured with one or more partial images is generated. In the pyramid structure, a partial image included in a given layer and a partial image included in a layer different from the given layer are the same in the number of pixels but are different in their resolutions. For example, in the case of combining two by two, four in total, partial images to generate one upper-layer partial image, the resolution of the upper-layer partial image becomes ½ times of the resolution of each lower-layer partial image used for composition.

Constructing such a partial image group with a pyramid structure enables switching the level of detail of an observation object displayed on a display device depending on a layer to which a tile image to be displayed belongs. For example, in a case where the lowermost-layer partial image is used, it is possible to display a narrow region of the observation object in detail and display a broad region of the observation object more coarsely as the upper-layer partial image is used.

The generated partial image group with a pyramid structure is able to be stored in, for example, a memory. Then, upon receiving a request for acquisition of a partial image including identification information from a different apparatus (for example, the analysis unit 15530), the server 15512 transmits a partial image corresponding to the identification information to the different apparatus.

Furthermore, a partial image, which is a pathological image, can be generated for every image capturing condition, such as focal length or staining condition. In a case where a partial image is generated for every image capturing condition, a specific pathological image and another pathological image corresponding to an image capturing condition different from a specific image capturing condition and belonging to the same region as that of the specific pathological image can be displayed side by side. The specific image capturing condition can be designated by a viewing person. Moreover, in a case where a plurality of image capturing conditions has been designated by a viewing person, pathological images corresponding to the respective image capturing conditions and belonging to the same region can be displayed side by side.

Moreover, the server 15512 can be configured to store a partial image group with a pyramid structure in a storage device other than the server 15512, such as a cloud server. Additionally, a part or the whole of generation processing for partial images such as that described above can be performed by, for example, a cloud server. Using such partial images in the above-mentioned way enables the user to get the sensation of observing an observation object while changing the observation magnification. Thus, controlling displaying enables serving as a kind of virtual microscope. The virtual observation magnification as used here is equivalent to a resolution in a practical sense.

The medical information system 15540, which is what is called an electronic health record system, stores information for identifying a patient, information about disease of the patient, and information about diagnosis, such as test information or image information used for diagnosis, a result of diagnosis, and prescription drugs. For example, a pathological image obtained by performing image capturing of an observation object of a patient can be temporarily stored via the server 15512 and then be displayed on the display device 15513. A pathologist who uses the pathological system 15510 makes a pathological diagnosis based on a pathological image displayed on the display device 15513. A result of the pathological diagnosis made by the pathologist is stored in the medical information system 15540.

The analysis unit 15530 is able to make analysis of a pathological image. This analysis can be performed with use of a learning model created by machine learning. The analysis unit 15530 can be configured to derive, as a result of the analysis, for example, a classification result of a specific region or a discrimination result of a tissue. Additionally, the analysis unit 15530 can be configured to derive, for example, cell information, discrimination results of, for example, the number, position, and luminance information, and scoring information about these. These pieces of information obtained by the analysis unit 15530 can be displayed as diagnosis support information on the display device 15513 of the pathological system 15510.

Furthermore, the analysis unit 15530 can be a server system configured with, for example, one or more servers (including a cloud server). Moreover, the analysis unit 15530 can be configured to be incorporated in, for example, the server 15512 included in the pathological system 15510. Thus, various analytical operations on a pathological image can be performed within the pathological system 15510.

The photoelectric conversion device described in any one of the above-described exemplary embodiments can be favorably applied to, for example, the microscope 15511 out of the above-described constituent components. Specifically, the photoelectric conversion device can be applied to a low-resolution image capturing unit and/or a high-resolution image capturing unit included in the microscope 15511. This enables reducing the size of the low-resolution image capturing unit and/or the high-resolution image capturing unit and, eventually, reducing the size of the microscope 15511. Accordingly, since the microscope 15511 becomes easy to transport, it becomes possible to make, for example, system deployment or system recombination easy. Additionally, since applying a photoelectric conversion device described in any one of the above-described exemplary embodiments enables performing a part or the whole of processing starting with acquisition of a pathological image and ending with analysis of the pathological image on the fly within the microscope 15511, it also becomes possible to output diagnosis support information more rapidly and appropriately.

Furthermore, the above-described configuration can be applied to not only a diagnosis support system but also all types of biological microscopes, such as a confocal microscope, a fluorescent microscope, and a video microscope. Here, the observation object can be a biological sample, such as a cultured cell, a fertilized egg, or a spermatozoon, a biomaterial, such as a cell sheet or a three-dimensional cell tissue, or a biological body, such as zebrafish or mouse. Moreover, the observation object can be observed in the state of being contained in not only a glass slide but also, for example, a well plate (microplate) or a Petri dish (cell-culture dish).

Additionally, a moving image can be generated from still images of the observation object acquired with use of a microscope. For example, a moving image can be generated from still images continuously captured for a predetermined period, or an image sequence can be generated from still images captured at predetermined intervals. Generating a moving image from still images in the above-mentioned way enables analyzing, with use of machine learning, dynamic characteristics of an observation object, such as motions, for example, pulsation, extension, and migration, of, for example, a cancer cell, a nerve cell, a myocardial tissue, or a spermatozoon, and fission processes of a cultured cell or a fertilized egg.

While various exemplary embodiments have been described above, the disclosure is not limited to such exemplary embodiments, and the exemplary embodiments can be altered or modified in various manners. Moreover, the exemplary embodiments can be applied to each other. Thus, a part of one exemplary embodiment can be substituted with a part of the other exemplary embodiment, or a part of one exemplary embodiment can be added to a part of the other exemplary embodiment. Moreover, a part of any exemplary embodiment can be omitted.

Making heat generated at a machine learning portion unlikely to propagate to a pixel array portion enables providing a photoelectric conversion device capable of reducing image quality degradation.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-016453 filed Feb. 4, 2021, which is hereby incorporated by reference herein in its entirety.

What is claimed is:

1. A photoelectric conversion device comprising:
   a first substrate including a pixel array portion, in which a plurality of photoelectric conversion portions is arranged in a two-dimensional array shape in planar view, and a first wiring pattern; and
   a second substrate including a machine learning portion configured to perform processing of a signal obtained from electric charge generated by the plurality of photoelectric conversion portions and a second wiring pattern, the first substrate and the second substrate being stacked on each other, wherein the first wiring pattern of the first substrate and the second wiring pattern of the second substrate are joined to each other to configure a metal joining portion, wherein a heat dissipation portion including the metal joining portion connected to the machine learning portion is located at a position overlapping the machine learning portion, and wherein the pixel array portion and the machine learning portion are located at respective positions not overlapping each other.

2. The photoelectric conversion device according to claim 1, wherein the heat dissipation portion is located around the pixel array portion in planar view.

3. The photoelectric conversion device according to claim 2, wherein the heat dissipation portion is located in such a way as to surround an entire circumference of the pixel array portion in planar view.

4. The photoelectric conversion device according to claim 2,
wherein the pixel array portion has a longitudinal direction and a transverse direction in planar view, and
wherein the heat dissipation portion is located along the longitudinal direction.

5. The photoelectric conversion device according to claim 2,
wherein the heat dissipation portion includes a first portion and a second portion, and
wherein the pixel array portion is sandwiched between the first portion and the second portion in planar view.

6. The photoelectric conversion device according to claim 4,
wherein the heat dissipation portion includes a first portion and a second portion, and
wherein the pixel array portion is sandwiched between the first portion and the second portion in planar view.

7. The photoelectric conversion device according to claim 1, wherein a number of metal joining portions each corresponding to the metal joining portion in a region overlapping the machine learning portion is larger than a number of metal joining portions each corresponding to the metal joining portion in a region not overlapping the machine learning portion.

8. The photoelectric conversion device according to claim 1,
wherein the heat dissipation portion includes a bypass capacitor, and
wherein the bypass capacitor and the metal joining portion are interconnected.

9. The photoelectric conversion device according to claim 8, wherein a density of the bypass capacitor differs between a region overlapping the machine learning portion and a region not overlapping the machine learning portion.

10. The photoelectric conversion device according to claim 8, wherein the bypass capacitor is connected to a semiconductor layer included in the first substrate.

11. The photoelectric conversion device according to claim 10,
wherein the semiconductor layer includes a transistor, and
wherein the bypass capacitor and the transistor are interconnected.

12. The photoelectric conversion device according to claim 8, wherein the bypass capacitor is connected to a pad electrode.

13. The photoelectric conversion device according to claim 1, wherein a plurality of metal joining portions each corresponding to the metal joining portion in a region overlapping the machine learning portion in planar view is connected to one wiring pattern.

14. The photoelectric conversion device according to claim 1,
wherein the heat dissipation portion includes a first region and a second region, which is located between the first region and the pixel array portion, and
wherein a number of metal joining portions each corresponding to the metal joining portion in the second region is larger than a number of metal joining portions each corresponding to the metal joining portion in the first region.

15. The photoelectric conversion device according to claim 1,
wherein the machine learning portion includes a first circuit, which operates at a first speed, and a second circuit, which operates at a second speed higher than the first speed, and
wherein a number of metal joining portions each corresponding to the metal joining portion overlapping the first circuit in planar view is smaller than a number of metal joining portions each corresponding to the metal joining portion overlapping the second circuit in planar view.

16. The photoelectric conversion device according to claim 1,
wherein the heat dissipation portion includes a first region and a second region, which is located between the first region and the pixel array portion, and
wherein a number of metal joining portions each corresponding to the metal joining portion in the second region is larger than a number of metal joining portions each corresponding to the metal joining portion in the first region,
wherein the machine learning portion includes a first circuit, which operates at a first speed, and a second circuit, which operates at a second speed higher than the first speed, and
wherein the first region and the first circuit are positioned to overlap each other in planar view, and the second region and the second circuit are positioned to overlap each other in planar view.

17. The photoelectric conversion device according to claim 1,
wherein the heat dissipation portion includes a first region and a second region, which is located between the first region and the pixel array portion, and a location density of metal joining portions each corresponding to the metal joining portion in the second region is higher than a location density of metal joining portions each corresponding to the metal joining portion in the first region, and
wherein the machine learning portion includes a first circuit, which operates at a first speed, and a second circuit, which operates at a second speed higher than the first speed, the first region and the first circuit are positioned to overlap each other in planar view, and the second region and the second circuit are positioned to overlap each other in planar view.

18. A photoelectric conversion system comprising:
the photoelectric conversion device according to claim 1; and
a signal processing unit configured to process a signal output from the photoelectric conversion device.

19. The photoelectric conversion system according to claim 18, wherein a plurality of metal joining portions each corresponding to the metal joining portion in a region overlapping the machine learning portion in planar view is connected to one pattern.

20. The photoelectric conversion system according to claim 18,
wherein the heat dissipation portion includes a first region and a second region, which is located between the first region and the pixel array portion, and
wherein a number of metal joining portions each corresponding to the metal joining portion in the second region is larger than a number of metal joining portions each corresponding to the metal joining portion in the first region.

21. The photoelectric conversion system according to claim 18,
wherein the machine learning portion includes a first circuit, which operates at a first speed, and a second circuit, which operates at a second speed higher than the first speed, and
wherein a number of metal joining portions each corresponding to the metal joining portion overlapping the first circuit in planar view is smaller than a number of metal joining portions each corresponding to the metal joining portion overlapping the second circuit in planar view.

22. A moving body comprising:

the photoelectric conversion device according to claim 1;

a distance information acquisition unit configured to acquire distance information about a distance from the moving body to an object from distance measuring information that is based on a signal output from the photoelectric conversion device; and a control unit configured to control the moving body based on the distance information.

* * * * *